United States Patent
Quanci et al.

(10) Patent No.: US 12,427,569 B2
(45) Date of Patent: Sep. 30, 2025

(54) CONTINUOUS GRANULATED METALLIC UNITS PRODUCTION, AND ASSOCIATED SYSTEMS, DEVICES, AND METHODS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Patrick James Mullarkey, Manhattan, IL (US); David James Schwake, Aurora, IL (US); Andrew Michael Butor, Cranberry Township, PA (US); Jonathan Hale Perkins, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 18/882,638

(22) Filed: Sep. 11, 2024

(65) Prior Publication Data
US 2025/0083232 A1 Mar. 13, 2025

Related U.S. Application Data

(60) Provisional application No. 63/581,946, filed on Sep. 11, 2023.

(51) Int. Cl.
*B22F 9/04* (2006.01)
*B22D 41/12* (2006.01)
(Continued)

(52) U.S. Cl.
CPC ............... *B22F 1/05* (2022.01); *B22D 41/12* (2013.01); *B22F 9/04* (2013.01); *B22F 9/08* (2013.01);
(Continued)

(58) Field of Classification Search
None
See application file for complete search history.

(56) References Cited

U.S. PATENT DOCUMENTS

| 2,052,783 A | 9/1936 | Mart |
| 3,316,075 A | 4/1967 | Grady |

(Continued)

FOREIGN PATENT DOCUMENTS

| CN | 1847411 A | 10/2006 |
| CN | 101301683 A | 11/2008 |

(Continued)

OTHER PUBLICATIONS

"Granulation of Hot Metal," by 360 Editor, Apr. 23, 2018, 4 pages.
(Continued)

*Primary Examiner* — George Wyszomierski
(74) *Attorney, Agent, or Firm* — Perkins Coie LLP; Vijay Kumar, Partner

(57) ABSTRACT

Systems for continuous granulated metallic unit (GMU) production, and associated devices and methods are disclosed herein. In some embodiments, a continuous GMU production system includes a furnace unit, a desulfurization unit, a plurality of granulator units, and a cooling system. The furnace unit can receive input materials such as iron ore and output molten metal. The desulfurization unit can reduce a sulfur content of the molten metallics received from the furnace unit. Each of the plurality of granulator units can include a tundish that can control the flow of molten metallics and a reactor that can granulate the molten metallics to form GMUs. The cooling system can provide cooled water to the reactor. Continuous GMU production systems configured in accordance with embodiments of the present technology can produce GMUs under continuous operations cycles for, e.g., at least 6 hours.

11 Claims, 26 Drawing Sheets

(51) Int. Cl.

| | | |
|---|---|---|
| *B22F 1/05* | (2022.01) | |
| *B22F 9/08* | (2006.01) | |
| *B61D 7/02* | (2006.01) | |
| *B61D 7/32* | (2006.01) | |
| *B61D 17/18* | (2006.01) | |
| *B61K 13/00* | (2006.01) | |
| *C02F 1/52* | (2023.01) | |
| *C21B 5/00* | (2006.01) | |
| *C21B 7/14* | (2006.01) | |
| *C21B 13/00* | (2006.01) | |
| *C21C 5/52* | (2006.01) | |
| *C21C 7/00* | (2006.01) | |
| *C21C 7/064* | (2006.01) | |
| *C21C 7/068* | (2006.01) | |
| *C22C 33/00* | (2006.01) | |
| *C22C 33/02* | (2006.01) | |
| *C22C 38/00* | (2006.01) | |
| *C22C 38/02* | (2006.01) | |
| *C22C 38/04* | (2006.01) | |
| *G01G 13/00* | (2006.01) | |
| *B22F 9/00* | (2006.01) | |
| *B61D 7/00* | (2006.01) | |
| *C02F 101/20* | (2006.01) | |
| *C02F 103/02* | (2006.01) | |
| *C02F 103/10* | (2006.01) | |
| *C02F 103/16* | (2006.01) | |

(52) U.S. Cl.
CPC ............... *B61D 7/02* (2013.01); *B61D 7/32* (2013.01); *B61D 17/18* (2013.01); *B61K 13/00* (2013.01); *C02F 1/52* (2013.01); *C21B 5/008* (2013.01); *C21B 7/14* (2013.01); *C21B 13/0006* (2013.01); *C21C 5/52* (2013.01); *C21C 5/527* (2013.01); *C21C 7/0006* (2013.01); *C21C 7/0075* (2013.01); *C21C 7/064* (2013.01); *C21C 7/068* (2013.01); *C22C 33/006* (2013.01); *C22C 33/0257* (2013.01); *C22C 33/0264* (2013.01); *C22C 33/0271* (2013.01); *C22C 38/002* (2013.01); *C22C 38/02* (2013.01); *C22C 38/04* (2013.01); *G01G 13/006* (2013.01); *B22F 2009/001* (2013.01); *B22F 2009/0808* (2013.01); *B22F 2301/35* (2013.01); *B22F 2304/15* (2013.01); *B22F 2998/10* (2013.01); *B22F 2999/00* (2013.01); *B61D 7/00* (2013.01); *C02F 2101/20* (2013.01); *C02F 2101/203* (2013.01); *C02F 2103/023* (2013.01); *C02F 2103/10* (2013.01); *C02F 2103/16* (2013.01); *C02F 2209/40* (2013.01); *C02F 2301/02* (2013.01); *Y10T 428/2982* (2015.01)

(56) References Cited

U.S. PATENT DOCUMENTS

| | | |
|---|---|---|
| 3,548,919 A | 12/1970 | Gyongyos et al. |
| 3,720,404 A | 3/1973 | Carleton et al. |
| 3,810,542 A | 5/1974 | Gloster et al. |
| 3,888,956 A | 6/1975 | Klint |
| 3,898,037 A | 8/1975 | Lange et al. |
| 3,923,935 A | 12/1975 | Cates |
| 4,139,369 A * | 2/1979 | Kandler ............. C21C 1/02 75/566 |
| 4,153,965 A | 5/1979 | Merly |
| 4,294,784 A | 10/1981 | Mailund |
| 4,330,511 A | 5/1982 | Nelson et al. |
| 4,402,884 A | 9/1983 | Koike et al. |
| 4,416,707 A * | 11/1983 | Foster ............. C21D 8/1272 148/120 |
| 4,546,907 A * | 10/1985 | Kemble ............. C21C 1/06 222/596 |
| 4,694,886 A * | 9/1987 | Sakaguchi ............. F27B 14/00 164/416 |
| 4,786,322 A * | 11/1988 | Green ............. C21C 1/10 75/312 |
| 4,893,568 A | 1/1990 | Adams |
| 5,017,218 A | 5/1991 | Lundström et al. |
| 5,084,093 A | 1/1992 | Yamaoka et al. |
| 5,458,671 A | 10/1995 | Butler et al. |
| 5,552,058 A | 9/1996 | Fanning |
| 5,673,779 A | 10/1997 | Spickelmire |
| 6,041,906 A | 3/2000 | Howard |
| 6,287,362 B1 | 9/2001 | Levey et al. |
| 8,646,700 B2 | 2/2014 | Lundström et al. |
| 9,840,746 B2 | 12/2017 | Lundström |
| 10,486,234 B2 | 11/2019 | Lundström |
| 10,618,112 B2 | 4/2020 | Lundström |
| 2001/0002535 A1 | 6/2001 | Liebig et al. |
| 2002/0026967 A1 | 3/2002 | Buenemann et al. |
| 2003/0015315 A1 | 1/2003 | Atsushi et al. |
| 2003/0164062 A1 | 9/2003 | Lundstrom et al. |
| 2005/0133192 A1* | 6/2005 | Meszaros ............. G01F 23/284 164/459 |
| 2009/0015028 A1 | 1/2009 | Zamorano |
| 2009/0171512 A1 | 7/2009 | Duncan |
| 2013/0180360 A1 | 7/2013 | Kim et al. |
| 2015/0330725 A1 | 11/2015 | Gurney |
| 2020/0122237 A1 | 4/2020 | Kemper et al. |
| 2025/0083222 A1 | 3/2025 | Quanci et al. |
| 2025/0083223 A1 | 3/2025 | Quanci et al. |
| 2025/0083224 A1 | 3/2025 | Quanci et al. |
| 2025/0083230 A1 | 3/2025 | Quanci et al. |
| 2025/0083231 A1 | 3/2025 | Quanci et al. |
| 2025/0083713 A1 | 3/2025 | Quanci et al. |
| 2025/0083980 A1 | 3/2025 | Quanci et al. |
| 2025/0084496 A1 | 3/2025 | Quanci et al. |
| 2025/0085156 A1 | 3/2025 | Quanci et al. |

FOREIGN PATENT DOCUMENTS

| | | |
|---|---|---|
| CN | 102700957 A | 10/2012 |
| CN | 103661440 B | 1/2016 |
| CN | 205496553 U | 8/2016 |
| CN | 107385135 A | 11/2017 |
| CN | 207205279 U | 4/2018 |
| CN | 212049627 U | 12/2020 |
| CN | 112305944 A | 2/2021 |
| CN | 113549715 A | 10/2021 |
| CN | 214470214 U | 10/2021 |
| CN | 113828788 A | 12/2021 |
| CN | 114433854 A | 5/2022 |
| CN | 216709283 U | 6/2022 |
| CN | 115417184 A | 12/2022 |
| CN | 115889716 A | 4/2023 |
| CN | 116550982 A | 8/2023 |
| GB | 1287510 A | 8/1972 |
| JP | H02236212 A | 9/1990 |
| JP | H06212212 A | 8/1994 |
| JP | 2001107118 A | 4/2001 |
| JP | 2002282866 A | 10/2002 |
| JP | 2005154847 A | 6/2005 |
| JP | 2020164992 A | 10/2020 |
| JP | 7033949 B2 | 3/2022 |
| JP | 2022149432 A | 10/2022 |
| KR | 20010111750 A | 12/2001 |
| KR | 100370611 B1 | 2/2003 |
| KR | 100847667 B1 | 7/2008 |
| KR | 101086315 B1 | 11/2011 |
| KR | 101091977 B1 | 12/2011 |
| KR | 20130076110 A | 7/2013 |
| KR | 20140102742 A | 8/2014 |
| KR | 20140120631 A | 10/2014 |
| KR | 20160034000 A | 3/2016 |

(56) References Cited

FOREIGN PATENT DOCUMENTS

| KR | 101649584 B1 | 8/2016 |
| KR | 20230028951 A | 3/2023 |
| WO | 2007105039 A2 | 9/2007 |

OTHER PUBLICATIONS

Beskow et al., "Industrial and High-Capacity Production of Granulated Pig Iron," Association for Iron & Steel Technology, AISTech, May 6-9, 2019, pp. 485-493.
Beskow et al., "World's First High-capacity Granshot © Iron Granulation in Operation at SSAB Oxelosund," AISTech 2009 Proceedings—vol. I, pp. 211-218.
Dupon et al., "GRANSHOT Iron Granulation for Optimized Plant Logistics," METEC InSteelCon Jun. 27-Jul. 1, 2011, Düsseldorf, Germany; 7 pages.
Granulated Pig Iron (GPI), International Iron Metallics Association, accessed Sep. 17, 2024 from https://www.metallics.org/gpi.html; 4 pages.
Industrial and High Capacity Granulation of Pig Iron, Data Sheet, Uvån Hagfors Teknologi AB, Jun. 2019, 4 pages.
Love et al., "Energy Recovery in Granshot ©—Process," KTH Industrial Engineering and Management, Stockholm, Sweden, Nov. 25, 2008, 70 pages.
Lundstrom et al., "Pig Iron Granulation at Iscor Saldanha Steel," AISTech 2004 Proceedings—vol. I, pp. 517-524.
Lundstrom, P. "Iron Granulation in Integrated Steel Plants," Nordic Steel & Mining Review 2006, pp. 16-17.
Polanco et al., "Granulation Methods for Metals and Ferroalloys," pp. 401-410. In: 72nd ABM Annual Congress, São Paulo, 2017.
Vesterberg et al., "Granulated metal product from direct tapped furnace—experience from operation at BEFESA Sweden," ATS-JSI Conference, Dec. 17-18, 2012, Paris, France, 2 pages.
International Iron Metallics Association (IIMA), "Use of Granulated Pig Iron (GPI) in the Electric Arc Furnace (EAF)," downloaded Nov. 30, 2024, dated 2018 (no month) (two pages) [wayback machine date of Feb. 9, 2022].
International Search Report and Written Opinion for International Application No. PCT/US2024/046274; Date of Mailing: Dec. 4, 2024; 12 pages.
Italimpianti Orafi, "Atomized metal powder: the revolution of the precious metals market," Online article, May 20, 2021; 2 pages.

\* cited by examiner

CONTINUOUS GRANULATED METALLIC UNITS PRODUCTION, AND ASSOCIATED SYSTEMS, DEVICES, AND METHODS

CROSS-REFERENCE TO RELATED APPLICATION(S)

The present application claims the benefit of U.S. Provisional Patent Application No. 63/581,946, filed Sep. 11, 2023, and titled "SYSTEM AND METHOD FOR CONTINUOUS GRANULATED PIG IRON (GPI) PRODUCTION," the disclosure of which is incorporated herein by reference in its entirety. The present application is related to the following applications, the disclosures of which are incorporated herein by reference in their entireties: U.S. patent application Ser. No. 18/882,116, filed Sep. 11, 2024, and titled "RAILCARS FOR TRANSPORTING GRANULATED METALLIC UNITS, AND ASSOCIATED SYSTEMS, DEVICES, AND METHODS"; U.S. patent application Ser. No. 18/882,045, filed Sep. 11, 2024, and titled "LOADING GRANULATED METALLIC UNITS INTO RAILCARS, AND ASSOCIATED SYSTEMS, DEVICES, AND METHODS"; U.S. patent application Ser. No. 18/882,191, filed Sep. 11, 2024, and titled "LOW-SULFUR GRANULATED METALLIC UNITS, AND ASSOCIATED SYSTEMS, DEVICES, AND METHODS"; U.S. patent application Ser. No. 18/882,661, filed Sep. 11, 2024, and titled "USE OF A BASIC OXYGEN FURNACE TO PRODUCE GRANULATED METALLIC UNITS, AND ASSOCIATED SYSTEMS, DEVICES, AND METHODS"; U.S. patent application Ser. No. 18/882,256, filed Sep. 11, 2024, and titled "LOW-CARBON GRANULATED IRON, AND ASSOCIATED SYSTEMS, DEVICES, AND METHODS"; U.S. patent application Ser. No. 18/882,531, filed Sep. 11, 2024, and titled "TORPEDO CARS FOR USE WITH GRANULATED METALLIC UNIT PRODUCTION, AND ASSOCIATED SYSTEMS, DEVICES, AND METHODS"; U.S. patent application Ser. No. 18/882,384, filed Sep. 11, 2024, and titled "TREATING COOLING WATER IN IRON PRODUCTION FACILITIES, AND ASSOCIATED SYSTEMS, DEVICES, AND METHODS"; U.S. patent application Ser. No. 18/882,465, filed Sep. 11, 2024, and titled "USE OF RESIDUAL IRON WITHIN GRANULATED METALLIC UNIT PRODUCTION FACILITIES, AND ASSOCIATED SYSTEMS, DEVICES, AND METHODS"; U.S. patent application Ser. No. 18/882,501, filed Sep. 11, 2024, and titled "PROCESSING GRANULATED METALLIC UNITS WITHIN ELECTRIC ARC FURNACES, AND ASSOCIATED SYSTEMS AND METHODS".

TECHNICAL FIELD

The present technology generally relates to continuous granulated metallic units production, and associated systems, devices, and methods.

BACKGROUND

Granulated pig iron (GPI) is a form of iron that is granulated into small, uniform particles, making it easier to handle, transport, and use in different metallurgical processes compared to conventional iron. The demand for GPI has been steadily increasing due to its versatile applications in various industries, including automotive, construction, and manufacturing. The growing popularity of GPI can be attributed to its high purity, consistent quality, and the efficiency it brings to the production of steel and other iron-based products.

Granulated pig iron is produced by rapidly cooling molten iron with water, resulting in the formation of granules. This process, known as granulation, is typically carried out downstream of blast furnaces. However, current production methods are often characterized by intermittent production cycles due to various operational constraints, such as the need for periodic maintenance, fluctuations in raw material supply, and energy consumption issues. These interruptions not only affect the overall efficiency but also lead to increased production costs and variability in product quality. Therefore, there is a need for an improved production process that can ensure continuous and stable granulation of iron, thereby enhancing productivity and reducing operational costs.

BRIEF DESCRIPTION OF THE DRAWINGS

Features, aspects, and advantages of the presently disclosed technology may be better understood with regard to the following drawings.

Figure 1:
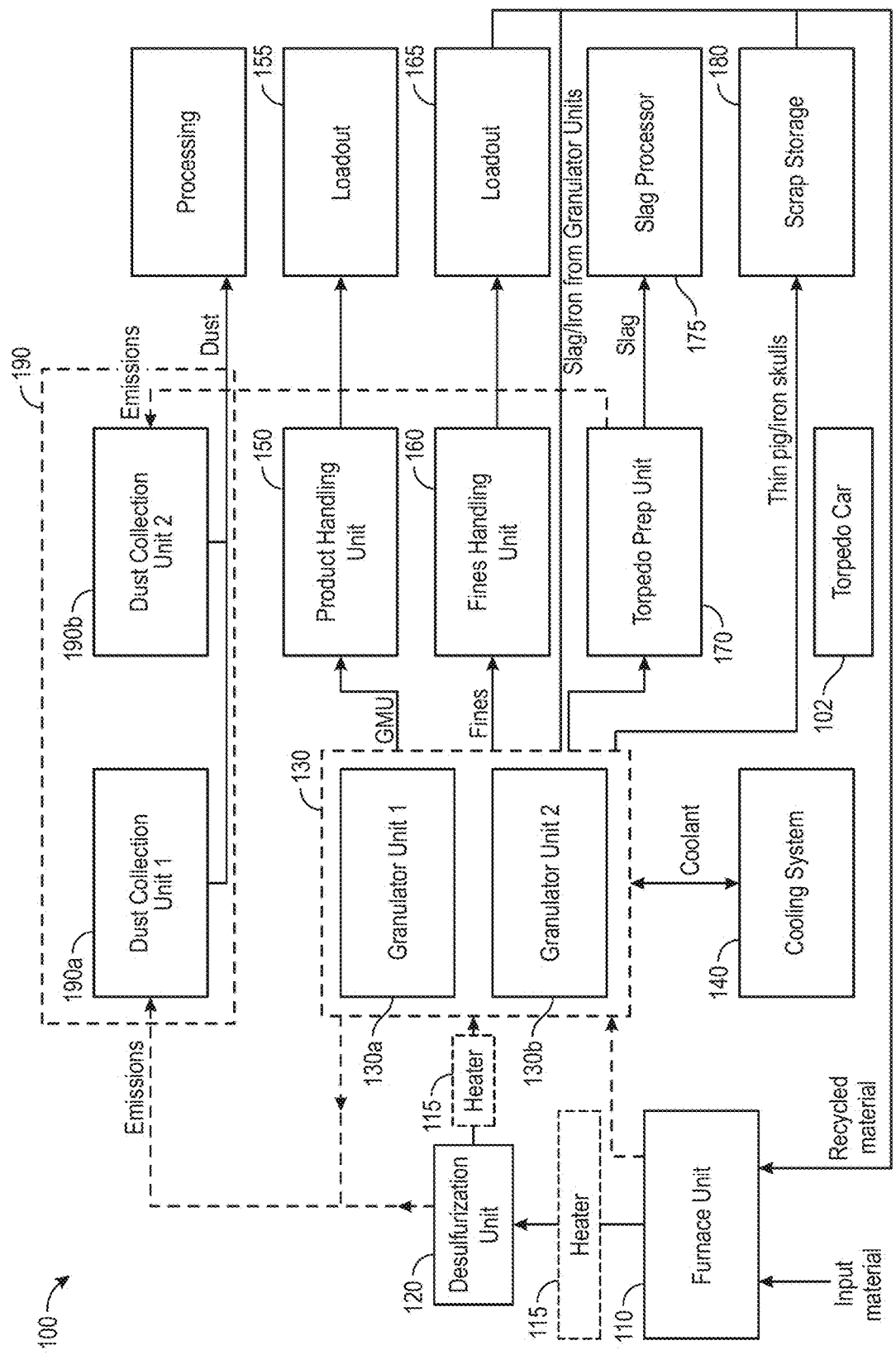
FIG. 1 is a schematic block diagram of a continuous granulated metallic unit (GMU) production system configured in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

The present technology is generally directed to systems, devices, and methods for continuously producing granulated metallic units (GMU). GMU can be produced by forming molten metallics in a blast furnace and rapidly cooling the molten metallics with water to form granules. Conventional granulation processes, however, are often disrupted by operational constraints such as the need for periodic maintenance, fluctuations in raw material supply, and high energy consumption. These interruptions not only reduce the overall efficiency of the production process but also lead to increased costs and variability in the quality of the final GMU product.

Embodiments of the present technology address at least some of the above-described issues by allowing continuous production of high quality GMU that can be used in multiple industries. As described herein, some embodiments of the present technology can include a continuous GMU production system comprising a furnace unit, a desulfurization unit, a plurality of granulator units, and a cooling system. The furnace unit can receive input materials such as iron ore and output molten metallics. The desulfurization unit can reduce a sulfur content of the molten metallics received from the furnace unit. Each of the plurality of granulator units can include a tundish that can control the flow of molten metallics and a reactor that can granulate the molten metallics to form GMU. The cooling system can provide cooled water to the reactor.

Specific details of several embodiments of the technology are described below with reference to FIGS. 1-28. Other details describing well-known structures and systems often associated with furnaces, rails, conveyor belts, emission hoods, automated control systems, etc. have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-28.

II. Embodiments of a Continuous Granulated Metallic Unit Production System

FIG. 1 is a schematic block diagram of a continuous GMU production system 100 ("the system 100") configured in accordance with embodiments of the present technology. As explained elsewhere herein, GMUs can include granulated iron (GI), granulated pig iron (GPI), granulated steel (GS), or GMU. Relatedly, molten metallics can include molten pig iron or molten steel. As used herein, the term "continuous" should be interpreted to mean continuous operations cycles, including in batch or semi-batch operations, for at least 2 hours, 4 hours, 6 hours, 8 hours, 10 hours, 12 hours, 16 hours, 20 hours, or 24 hours. The duration of the continuous operations cycles can depend at least in part on the size of the GMU to be produced by the system 100. The system 100 can include a furnace unit 110, a desulfurization unit 120, granulator units 130 including a first granulator unit 130a and a second granulator unit 130b, and a cooling system 140. The furnace unit 110 can receive input materials (e.g., iron ore, coke, limestone, and/or preheated air) and/or recycled material, which can be sourced from downstream components of the system 100 as described in further detail herein. Equations (1)-(6) below detail some of the chemical processes controlled at the furnace unit.

$$C + O_2 \rightarrow CO_2 \quad (1)$$

$$CO_2 + C \rightarrow 2CO \quad (2)$$

$$Fe_2O_3 + 3CO \rightarrow 2Fe + 3CO_2 \quad (3)$$

$$Fe_2O_3 + 3C \rightarrow 2Fe + 3CO \quad (4)$$

$$CaCO_3 \rightarrow CaO + CO_2 \quad (5)$$

$$CaO + SiO_2 \rightarrow CaSiO_3 \quad (6)$$

Equation (1) represents the combustion of coke, which is a form of carbon. When coke reacts with oxygen gas introduced into the furnace (e.g., via an oxygen lance), it forms carbon dioxide. This exothermic reaction releases a significant amount of heat, which is essential for maintaining the high temperatures required for subsequent reactions. The carbon dioxide produced via Equation (1) further reacts with additional coke to form carbon monoxide, as illustrated by Equation (2). This endothermic reaction helps to moderate the temperature within the furnace unit 110. Equations (3) and (4) represent the reduction of iron ore ($Fe_2O_3$). As illustrated by Equation (3), the iron oxide reacts with the carbon monoxide produced via Equation (2), which acts as a reducing agent to convert iron ore into iron and produces carbon dioxide as a byproduct. Alternatively, as illustrated by Equation (4), the iron ore may be reduced directly by the coke, albeit less commonly. Equations (5) and (6) represent the formation of slag. As illustrated by Equation (5), the calcium carbonate/limestone ($CaCO_3$) can decompose into calcium oxide and carbon dioxide at the high temperatures of the furnace unit 110. As illustrated by Equation (6), the calcium oxide can then react with silica ($SiO_2$), an impurity in the iron ore, to form calcium silicate ($CaSiO_3$), also known as slag. The furnace unit 110 can output molten metallics (from Equations (3) and (4)) and slag (from Equations (5) and (6)).

In some embodiments, the input materials (e.g., the coke, the iron ore, and/or the limestone) include sulfur, which can remain in the molten metallics output by the furnace unit 110. A torpedo car 102 or other transfer vessel can transfer the molten metallics from the furnace unit 110 to the desulfurization unit 120. The desulfurization unit 120 can include equipment to reduce the sulfur content of the molten metallics. For example, one or more lances can be used to deliver magnesium (Mg), calcium carbide ($CaC_2$), or other sulfur-reducing agent to the molten metallics. In some embodiments, the molten metallics are desulfurized while remaining inside the torpedo car 102. Equations (7) and (8) below detail the reactions between the sulfur and the sulfur-reducing agents.

$$Mg + S \rightarrow MgS \qquad (7)$$

$$CaC_2 + S \rightarrow CaS + 2C \qquad (8)$$

The resulting substances, including magnesium sulfide (MgS) and calcium sulfide (CaS), are not soluble in molten metallics and will therefore be in solid form (e.g., as solid particles) that can be more readily removed at the desulfurization unit 120 and/or further downstream. As discussed further herein, reducing the sulfur content can increase the quality of the GMU product and/or allow the production process to be continuous. After the desulfurization process, the torpedo car 102 or other transfer vessel (e.g., a ladle) can transfer the molten metallics from the desulfurization unit 120 to the granulator units 130. In some embodiments, as indicated by the dashed arrow, the desulfurization unit 120 is bypassed and the molten metallics are transferred directly from the furnace unit 110 to the granulator units 130. Notably, conventional facilities may not include a desulfurization unit or may otherwise lack the ability to desulfurize molten metallics. One reason for this is that conventional steelmaking facilities directly feed molten metallics from blast furnaces to basic oxygen furnaces, and opt to granulate the molten metallics only when the basic oxygen furnaces are down. Because producing GPI is a backup operation for such facilities, the added complexity and costs associated with establishing desulfurization equipment may not be economical.

In some embodiments, the temperature of the molten metallics are within a predetermined range prior to reaching the granulator units 130. For example, maintaining the molten metallics in a sufficiently fluid state can better ensure the formation of uniform granules and help avoid premature solidification, which can lead to irregular granule shapes and sizes. In some embodiments, the system includes one or more heaters 115 before and/or after the desulfurization unit 120, e.g., to reheat the molten metallics within the torpedo car 102. For example, if the temperature of the molten metallics are below a threshold temperature value, the heater 115 can be used to raise the temperature of the molten metallics in the torpedo car 102 to be within a desired temperature range. The threshold temperature value can vary between different compositions, and can be between 2300-2500° F., between 2300-2400° F., or between 2340-2350° F. Additionally or alternatively, the threshold temperature can be at least 100° F., 200° F., 300° F., or 400° F. above a solidification temperature, depending on a chemical makeup of the composition. In some embodiments, the heater 115 comprises one or more oxygen lances.

The torpedo car 102 can transfer the molten metallics to one of the granulator units 130. While FIG. 1 illustrates two granulator units 130, it will be understood that the system 100 can include one, three, four, five, six, or more granulator units 130. The granulator units 130 can each include a granulation reactor that receives and granulates molten metallics to form granulated products. For example, the granulation reactor can include a cavity that holds a coolant, and the molten metallics can be transferred (e.g., poured, sprayed) onto a target of the reactor holding the water. The water can be maintained at a sufficiently low temperature by the cooling system 140 (e.g., cooled directly by pumping the water between the granulator units 130 and the cooling system 140, cooled indirectly by pumping a coolant separate from the water that receives the molten metallics). In some embodiments, the granulator units 130 each includes one or more components for controlling the flow of molten metallics from the torpedo car 102 to the granulation reactor. As one of ordinary skill in the art will appreciate, flow control can affect the shape, size, and quality of the granulated products. The granulator units 130 can also include a dewatering assembly for drying the granulated products from the granulation reactor to output GMU. The granulator units 130 can further include a classifier assembly for filtering the filtrate from the dewatering assembly to output fines.

The system 100 can further include a product handing unit 150 to receive the GMU output by the granulator units 130 (e.g., by the dewatering assembly), and a loadout 155 downstream of the product handling unit 150. Additionally, the system 100 can further include a fines handling unit 160 to receive the fines output by the granulator units 130 (e.g., by the classifier assembly), and a loadout 165 downstream of the fines handling unit 160. In some embodiments, the product handling unit 150 and/or the fines handling unit 160 each includes one or more conveyor belts, diverters, stockpile locations, etc. The system 100 can additionally include a torpedo preparation unit 170 that can remove slag and/or kish from the torpedo car 102. For example, the torpedo car 102, after delivering the molten metallics to the granulator units 130, can proceed to the torpedo prep unit 170 to be cleaned or otherwise prepared for the next cycle of transferring molten metallics. The removed slag can be subsequently transferred to a slag processor 175. The system 100 can further include a scrap storage 180 that can receive thin pig and/or iron skulls from the granulator units 130.

As shown in FIG. 1, the fines at the loadout 165, slag and/or iron from the granulator units 130, and/or the thin pig and/or iron skulls at the scrap storage 180 can be fed back into the furnace unit 110 as recycled materials. In some embodiments, the recycled materials are processed (e.g., pelletized) prior to being fed into the furnace unit 110. Furthermore, emissions from various components of the system 100 can be collected and directed towards a dust collection unit 190 (e.g., a baghouse, a scrubber, etc.). In FIG. 1, for example, the emissions from the desulfurization unit 120 and the granulator units 130 are directed to a first dust collection unit 190*a*, and the emissions from the torpedo prep unit 170 are directed to a second dust collection unit 190*b*. Each of the dust collection units 190 can filter the emissions to remove dust therefrom so that clean waste gas is sent to stacks (not shown) to be released into the atmosphere, and the removed dust can be directed to further processing.

Figure 2:
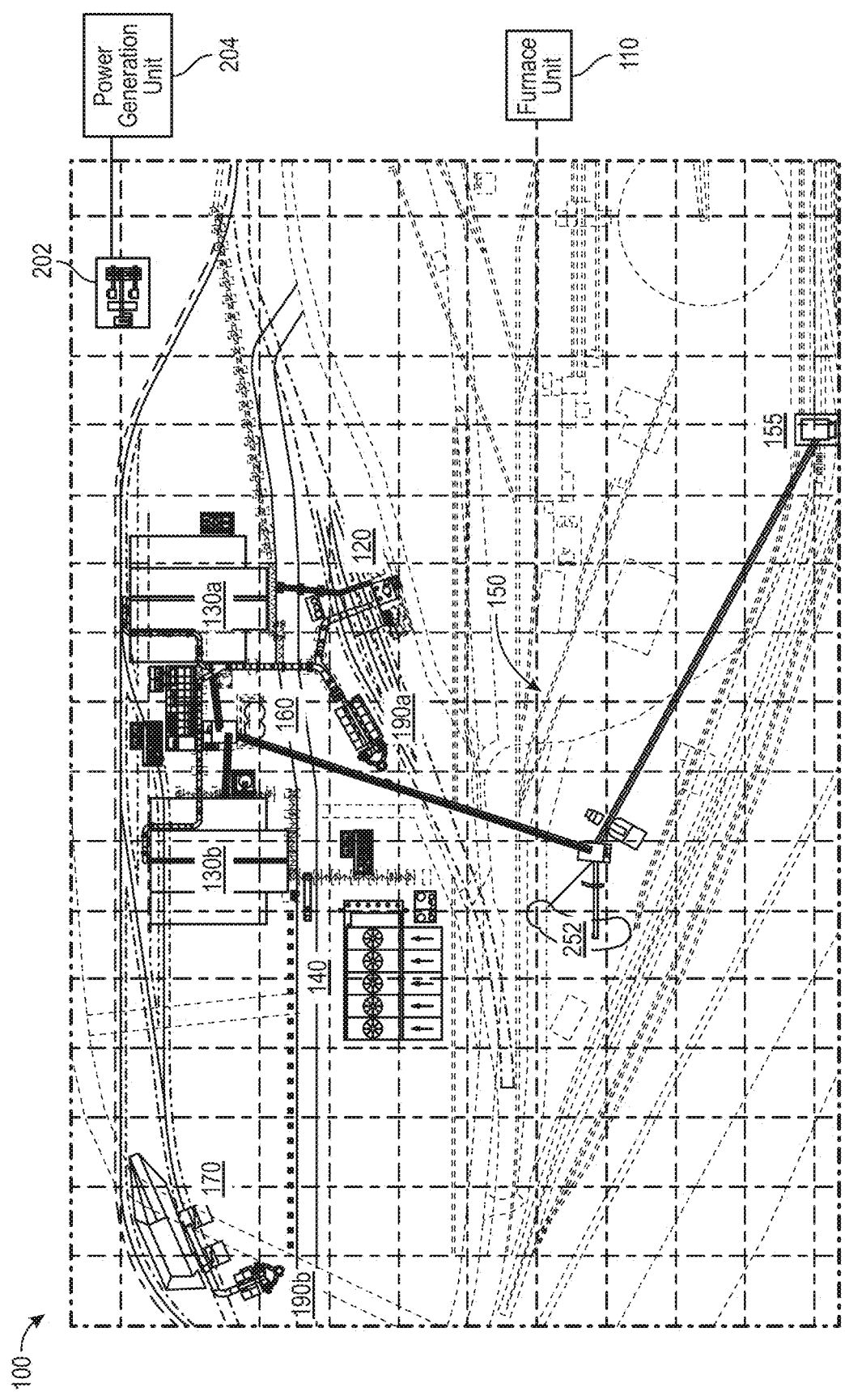
FIG. 2 is a plan view of the continuous GMU production system of FIG. 1, configured in accordance with embodiments of the present technology.

FIG. 2 is a plan view of the continuous GMU production system 100. It will be appreciated that the plan view illustrated in FIG. 2 is merely one example, and that the components of the system 100 can be arranged differently in other embodiments. As shown, the system 100 can further include an electrical building 202 and a power generation unit 204 for providing electrical power to the system 100. As discussed further herein, one or more of the components of the system 100 can be powered electrically and/or hydraulically. The furnace unit 110 can be located away from many of the other components of the system 100. The torpedo car 102 or other transfer vessel (not shown) can transfer the molten metallics from the furnace unit 110 to the desulfurization unit 120 along tracks illustrated in dashed lines.

Figure 3:
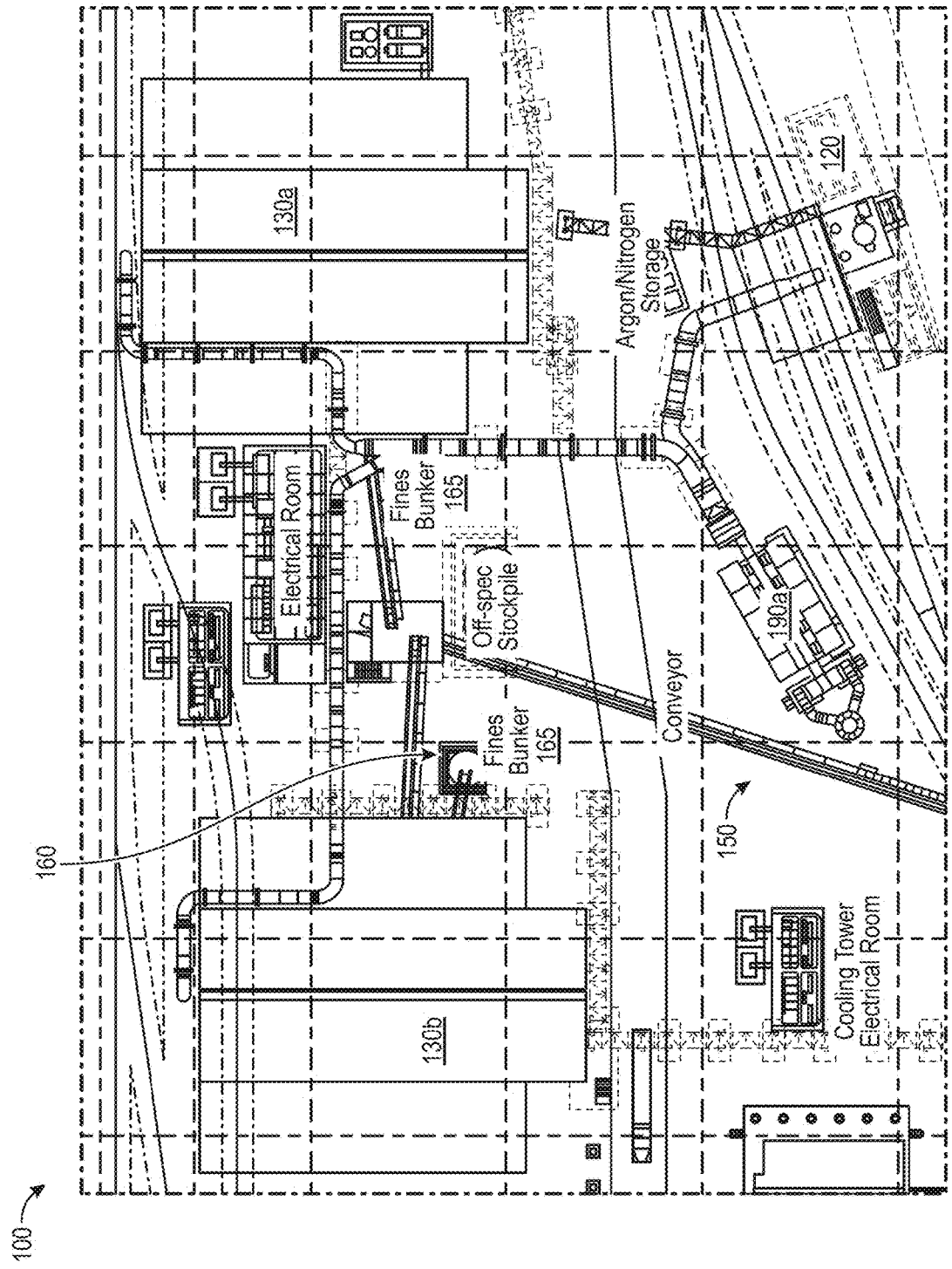
FIG. 3 is an enlarged view of the continuous GMU production system of FIG. 2.

Referring momentarily to FIG. 3, which is an enlarged plan view of the system 100, the desulfurization unit 120 can desulfurize the molten metallics while the molten metallics remains in the torpedo car 102. Once the molten metallics are desulfurized, the torpedo car 102 can continue along the tracks to the granulator units 130. The torpedo car 102 can deliver the molten metallics to either of the first granulator unit 130a or the second granulator unit 130b depending on, e.g., the availability of each of the granulator units 130. The GMU produced by each of the granulator units 130 can be transferred downstream via one or more conveyor belts that form part of the product handling unit 150. The fines produced by each of the granulator units 130 can be transferred to fines bunkers located adjacent to the granulator units 130 and ultimately sent to the loadout(s) 165. As shown in FIG. 3, the first dust collection unit 190a can be connected to each of the desulfurization unit 120 and the granulator units 130 via pipes to collect emissions therefrom.

Returning to FIG. 2, the cooling system 140 can be located adjacent to the granulator units 130 to provide cooling thereto as needed. The product handling unit 150 can include a stockpile area 252 for storing GMU products. One or more conveyor belts can extend between each of the granulator units 130 and the stockpile area 252, and between the stockpile area 252 and the loadout 155. In some embodiments, the loadout 155 comprises a building at which a desired quantity of GMUs can be measured and transferred to a railcar or other transfer vehicle. In some embodiments, the GMUs is subsequently transferred to an electric arc furnace (not shown) for steel production. The torpedo car 102, after delivering the molten metallics to the granulator units 130, can continue along the tracks to reach the torpedo prep unit 170. As discussed above with reference to FIG. 1, the torpedo prep unit 170 can facilitate removal of slag and/or kish from the torpedo car 102. The second dust collection unit 190b can be connected to the torpedo prep unit 170 via pipes to collect emissions therefrom.

Referring to FIGS. 1-3 together, the system 100 is expected to be able to continuously produce GMU, unlike conventional GMU production systems. First, the inclusion of the desulfurization unit 120 provides several advantages. For example, GMUs with lower sulfur content produces less slag when melted at an electric arc furnace downstream, saving associated time, costs, and energy consumption. For example, a relatively lower level of sulfur and/or carbon content can improve throughput and increase production of the downstream electric arc furnace (EAF) and/or ladle metallurgical furnace (LMF). The use of GMUs with lower sulfur content can also ease maintaining the desired chemical composition and temperature, reducing the frequency of adjustments and interruptions during the melting cycle. Lower sulfur levels can also result in less wear and tear on other components of the system, reducing maintenance needs and associated downtime.

Second, the inclusion of a plurality of granulator units 130 allows molten metallics to be granulated at separate granulator units in parallel. The granulator units 130 can also serve as backups for one another in case one of the granulator units 130 is down (e.g., due to malfunctioning components, maintenance, etc.) or in a turndown situation. Furthermore, in some embodiments, the various components of the granulator units 130 are modular. For example, each of the components can be easily and independently removed (e.g., for maintenance) and/or replaced (e.g., via an overhead crane) without impacting operation of the other components.

As discussed above, the system 100 is designed for continuous operation. Relative to non-continuous GPI production systems, embodiments of the present technology enhance energy efficiency and reduces emissions by minimizing the need for frequent shutdowns and restarts, which are often associated with excessive venting and/or less efficient operations. As described herein, some embodiments include (i) a desulfurization unit that lowers the sulfur content in molten metal, thereby reducing sulfur dioxide ($SO_2$) emissions, (ii) dust collection units that filter out particulate matter, thereby reducing air pollution, (iii) infrastructure to recycle fines, slag, iron skulls and other residual and/or previously-processed metallics, thereby reducing the environmental impact associated with raw material extraction and conserving natural resources, and/or (iv) water management and cooling systems that minimize heat losses, enhance thermal efficiency of production processes, and optimize water consumption. Overall, the continuous GMU production system 100 enhances productivity while minimizing greenhouse gas emissions and waste, contributing to more sustainable industrial practices and helping mitigate climate change.

Relatedly, conventional iron production has a significant environmental impact due to its high energy consumption and emissions of pollutants. As such, embodiments of the present technology which relate to GMU production systems can reduce this impact. Sulfur, phosphorus, and silicon in GPI negatively affect the quality and properties of final metal products, leading to issues like reduced ductility, toughness, and weldability, as well as surface defects and brittleness. These impurities also contribute to the formation of non-metallic inclusions and excessive slag, complicating metal processing and compromising product quality. Sulfur, in particular, accelerates the wear and erosion of metal processing equipment, increasing maintenance costs and decreasing equipment lifespan. Embodiments of the present technology include methods for removing these impurities in part can improve the quality and durability of final metal products and enhances the efficiency and lifespan of processing equipment, leading to cost savings and more sustainable production practices.

III. Embodiments of Components of a Continuous GMU Production System

Figure 4:
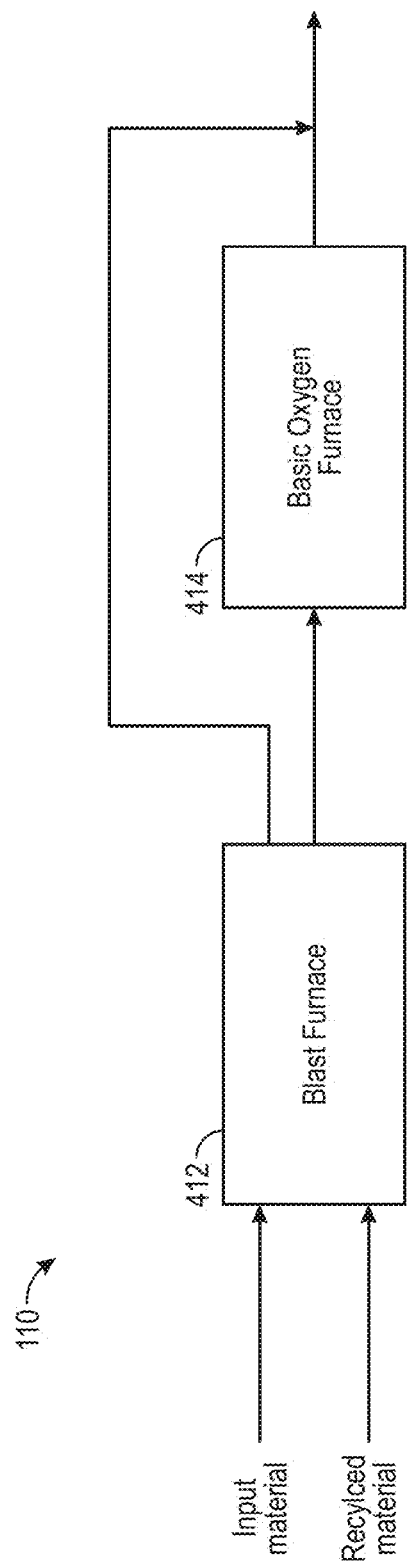
FIG. 4 is a schematic block diagram of a furnace unit configured in accordance with embodiments of the present technology.

FIG. 4 is a schematic block diagram of the furnace unit 110 configured in accordance with embodiments of the present technology. The furnace unit 110 can include one or more blast furnaces 412 ("the BF 412") and/or one or more basic oxygen furnaces 414 ("the BOF 414"). The BF 412 can receive the input material (e.g., coke, iron ore, limestone, preheated air) and/or the recycled material (e.g., fines, iron skulls, slag) to produce molten metallics according to Equations (1)-(4) detailed above. In some embodiments, the molten metallics from the BF 412 is fed to the BOF 414 for reheating. For example, oxygen lances at the BOF 414 can be used to bring the temperature of the molten metallics to within a desired temperature range. The oxygen can also be used to control the carbon content of the molten metallics by, e.g., oxidizing the carbon according to Equations (1) and/or (2) detailed above. Reducing the carbon content can help produce steel with certain material properties downstream. In some embodiments, oxygen is added (e.g., using oxygen lances) at the torpedo car 102, a ladle, or another transfer vessel as opposed to at the BOF 414. In some embodiments, the BOF 414 and/or oxygen delivery processes are skipped, and the molten metallics are transferred downstream from the BF 412. Referring momentarily back to FIG. 1, although FIG. 1 illustrates the furnace unit 110 as upstream of the desulfurization unit 120, in some embodiments, the desulfurization unit 120 can be used elsewhere, such as after the BF 412 and before the BOF 414.

Figure 5:
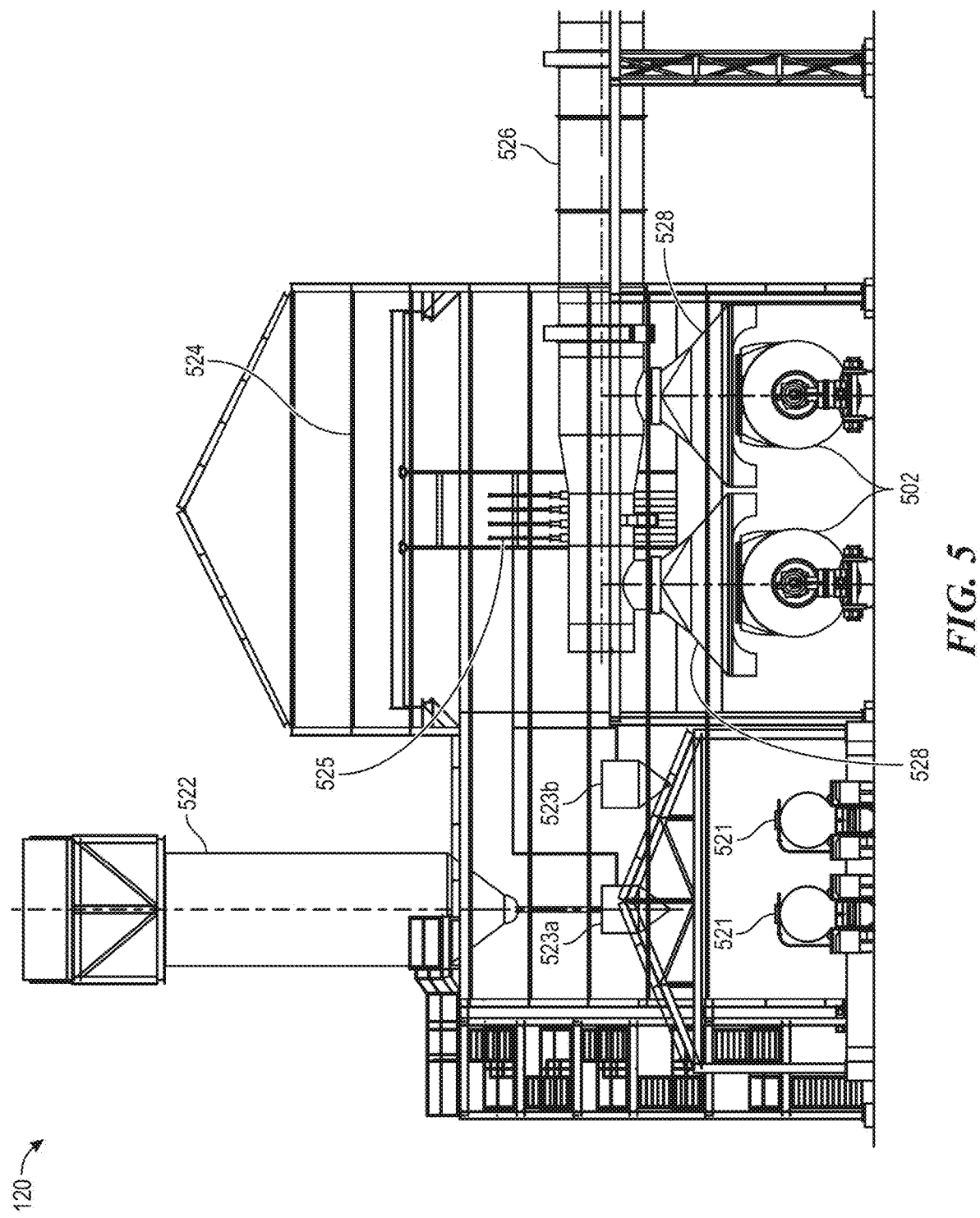
FIGS. 5 and 6 are front and side views, respectively, of a desulfurization unit configured in accordance with embodiments of the present technology.
Figure 6:
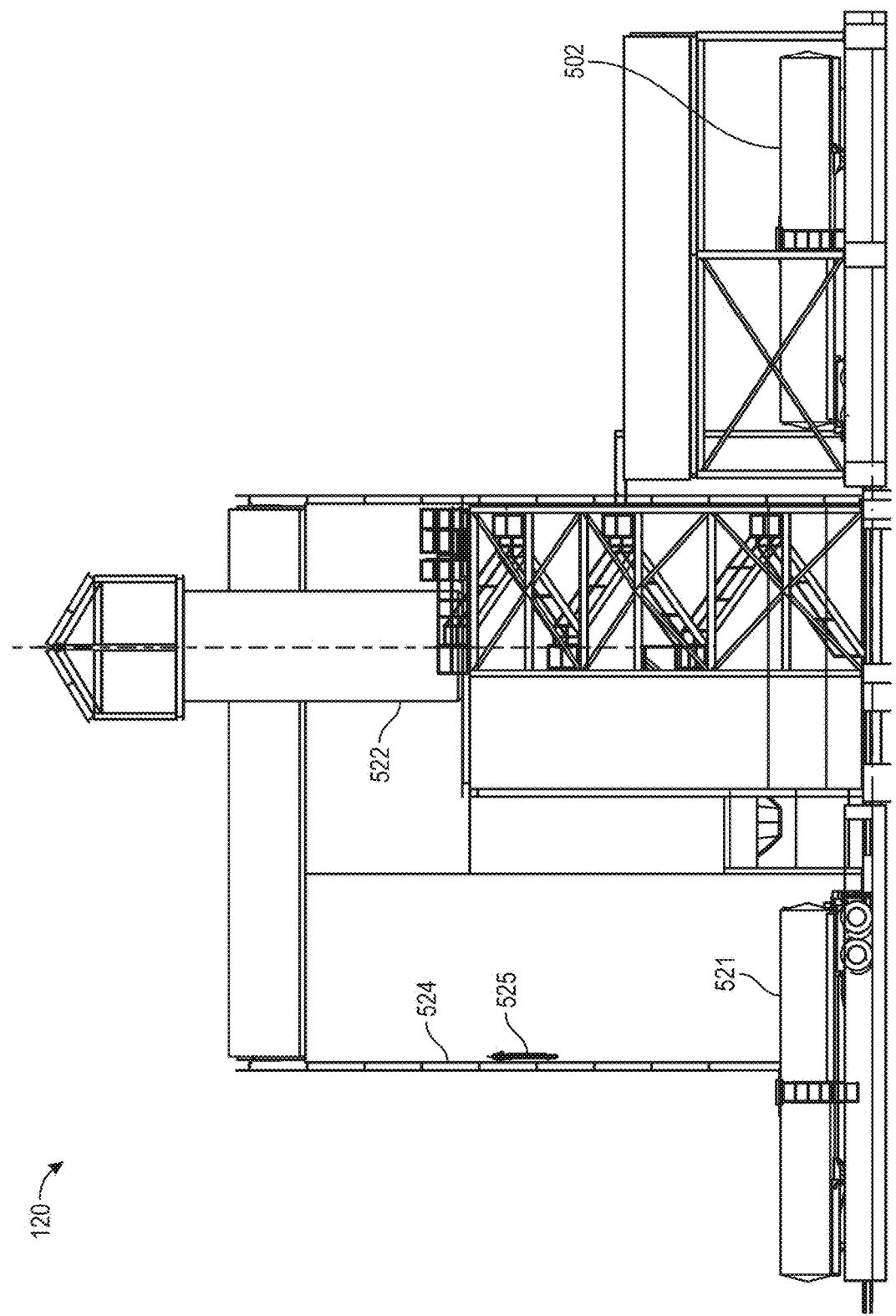

FIGS. 5 and 6 are front and side views, respectively, of the desulfurization unit 120 configured in accordance with embodiments of the present technology. Referring to FIGS. 5 and 6 together, the desulfurization unit 120 can include a plurality of storage units for receiving and storing sulfur-reducing agents, including a silo 522, a first hopper 523a, a second hopper 523b, and one or more vessels 521 (e.g., tanker trailers). For example, the silo 522 and the first hopper 523a can store calcium carbide, and the second hopper 523b and the vessels 521 can store magnesium. In some embodiments, nitrogen gas is also stored in the storage units to provide an inert storage atmosphere. The desulfurization unit 120 can also include an overhead crane 524 and one or more lances 525 that can be controlled to transfer the sulfur-reducing agents (e.g., calcium carbide, magnesium) from the storage units to the molten metallics in one or more torpedo cars 502.

The sulfur-reducing chemical reactions of Equations (5) and (6) detailed above can generate particulate and gas emissions (e.g., acetylene, hydrogen sulfide). The torpedo cars 502 can be positioned underneath respective emission hoods 528 that can collect the emissions and direct them towards the dust collection unit 190 (FIGS. 1-3) via a pipe 526. In the illustrated embodiment, the desulfurization unit 120 includes two emission hoods 528 to allow the desulfurization of molten metallics in two torpedo cars 502 in parallel. It will be appreciated that in other embodiments, the desulfurization unit 120 can include one, three, four, five, six, or more emission hoods 528 to allow a different number of torpedo cars 502 at the desulfurization unit 120 simultaneously. After sufficient time for the sulfur-reducing reactions, the byproducts of the reactions (e.g., magnesium sulfide, magnesium oxide, calcium sulfide) can be removed by, e.g., skimming the solids off the surface of the molten metal.

Figure 7:
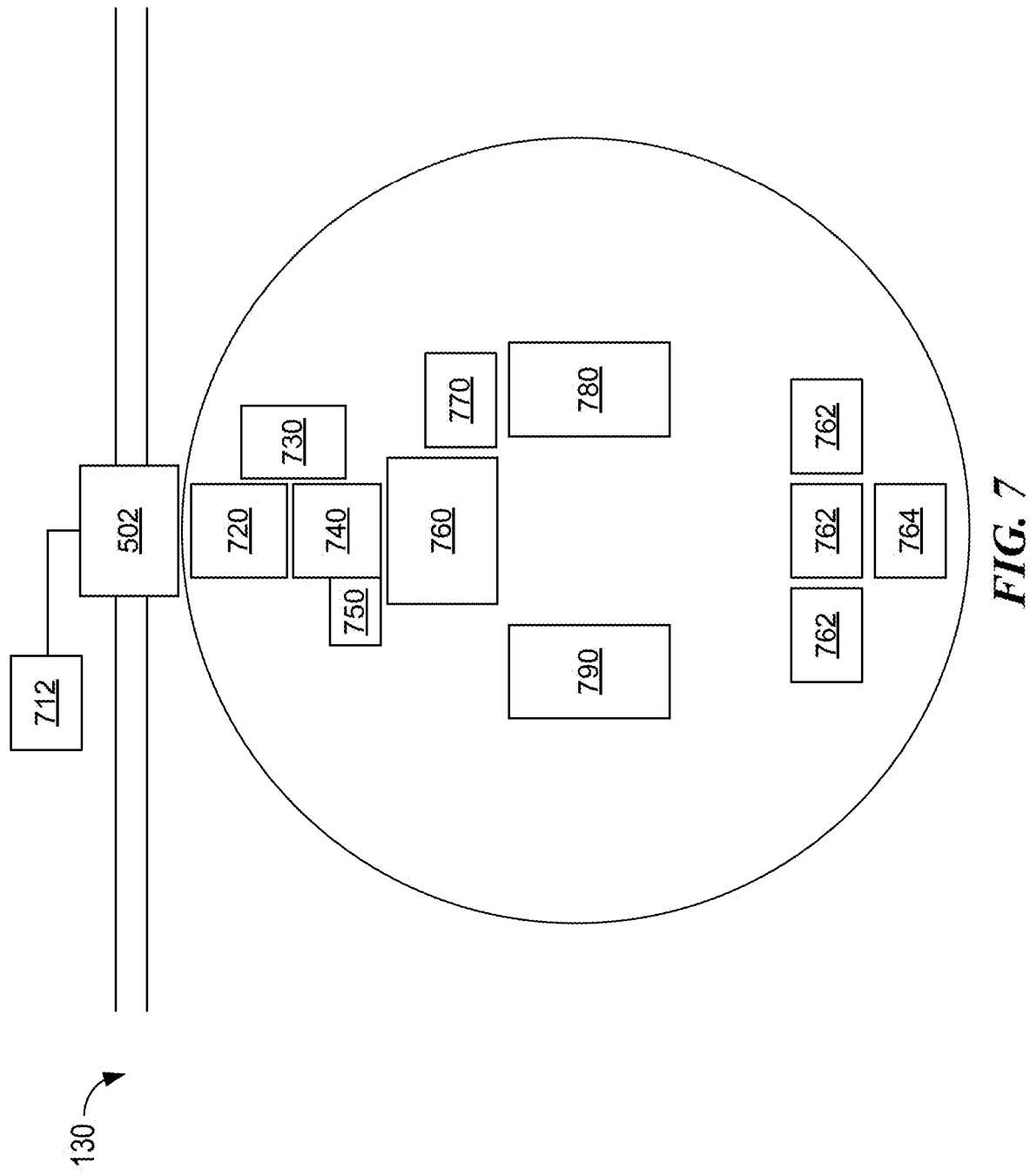
FIGS. 7, 8, and 9 are schematic plan, right side, and left side views, respectively, of a granulator unit configured in accordance with embodiments of the present technology.
Figure 8:
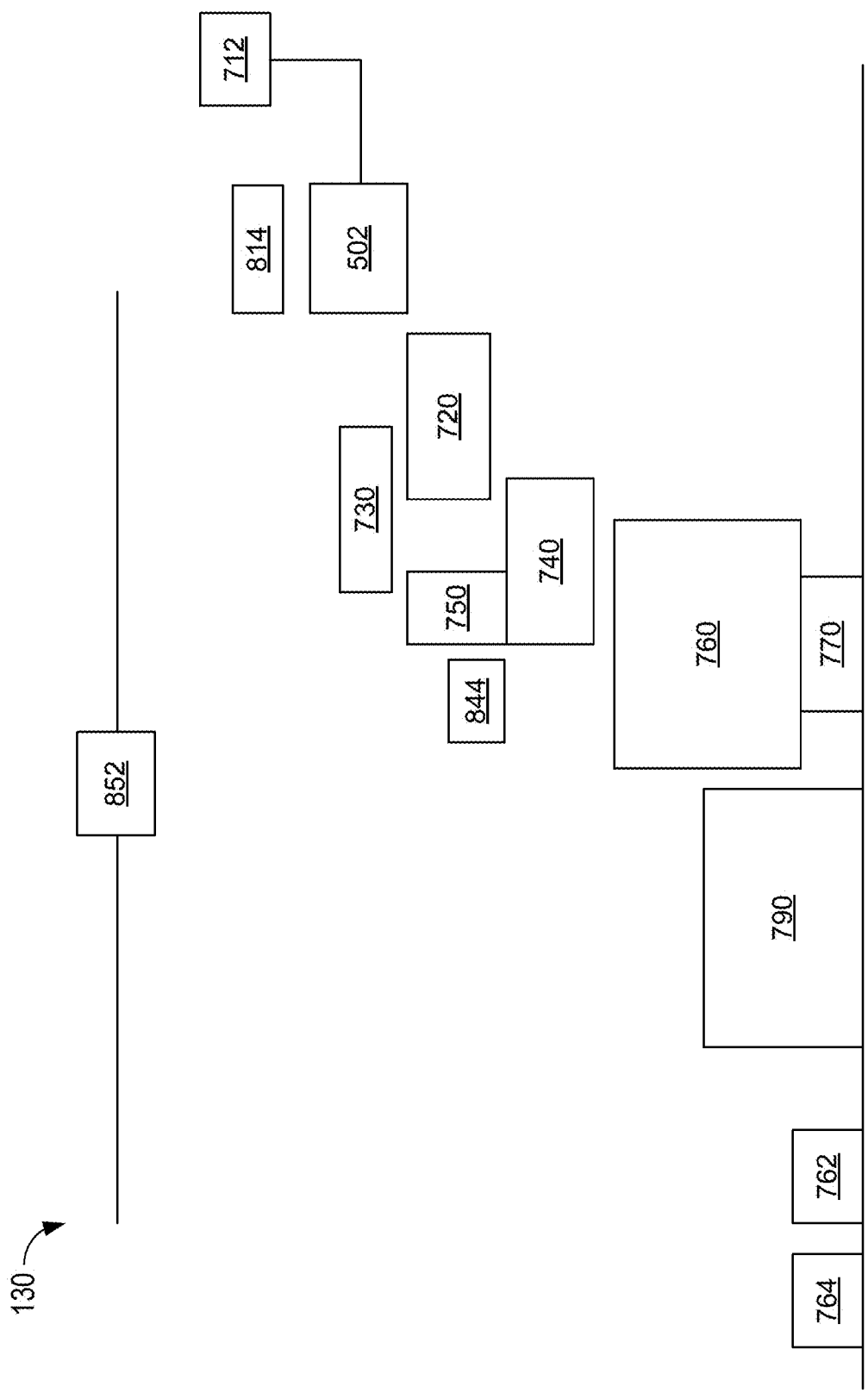
Figure 9:
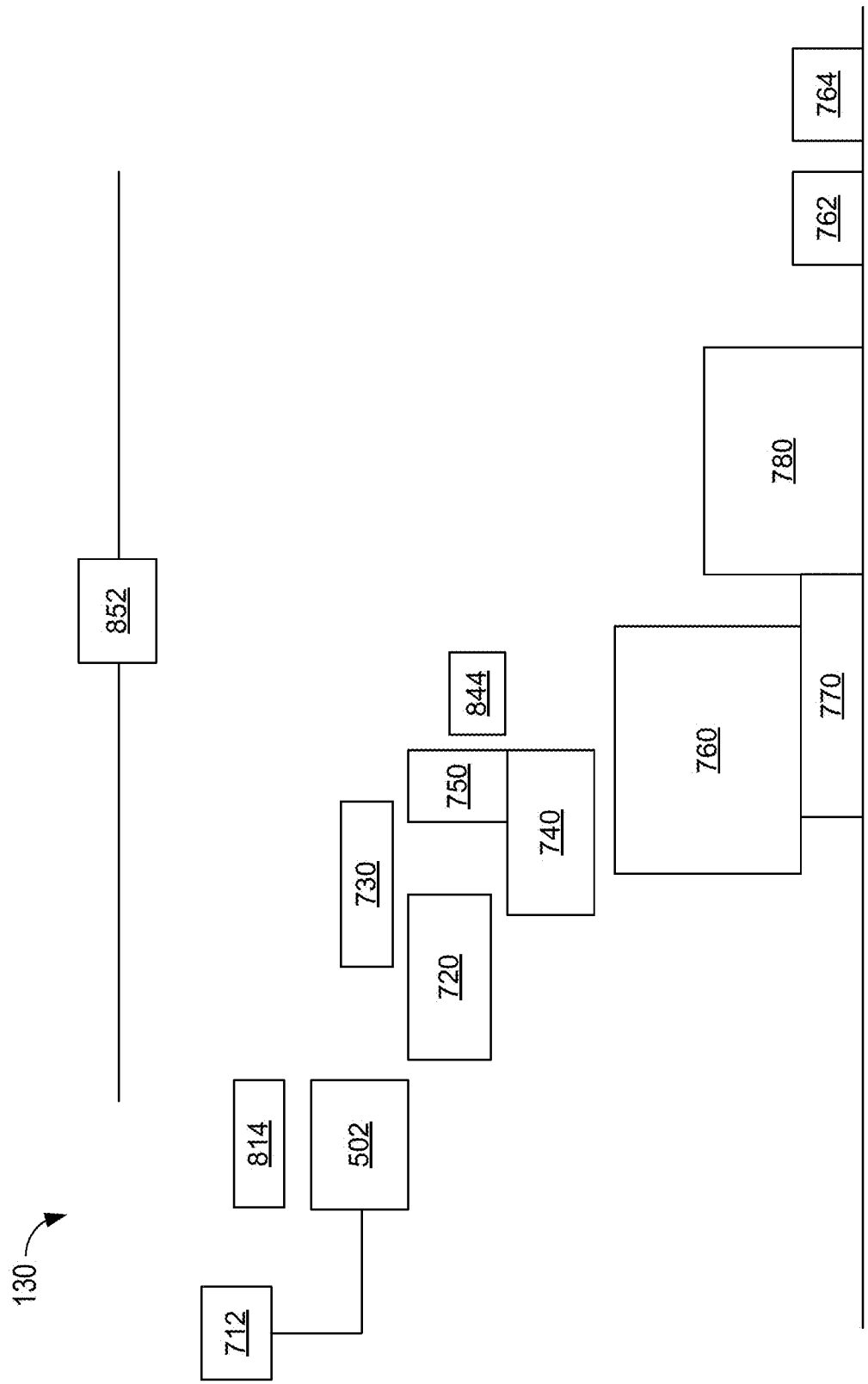

FIGS. 7, 8, and 9 are schematic plan, right side, and left side views, respectively, of one of the granulator units 130 configured in accordance with embodiments of the present technology. It will be appreciated that the other granulator unit(s) 130 can be identical or generally similar in arrangement, structure, and function. The granulator unit 130 can include a torpedo controller 712 and a torpedo hood 814 (shown schematically in FIGS. 8 and 9). The controller 712 can be operably coupled to the torpedo car 502 to control the tilting thereof to transfer (e.g., pour) the molten metallics out of the torpedo car 502. For example, an opening of the torpedo car 502 may face generally upward during transit, and may face generally horizontally upon rotation. In the illustrated embodiment, the torpedo hood 814 is positioned generally over the torpedo car 502 to collect emissions from the molten metallics as the torpedo car 502 is tilted.

The granulator unit 130 can also include a runner 720, a tundish 740, a stopper rod assembly 750, and a granulation reactor 760. As best seen in FIGS. 8 and 9, the runner 720 can be positioned near and at a similar height as the torpedo car tracks so that the runner 720 can receive molten metallics from the torpedo car 502 as the torpedo car 502 is tilted. The tundish 740 can be positioned downstream of and at a lower height than the runner 720 to receive the molten metallics therefrom. An emission hood 730 can be positioned at the interface between the runner 720 and the tundish 740, and another emission hood (or pipe) 844 can be positioned adjacent to a front portion of the tundish 740 to collect emissions from molten metallics traveling thereat. The stopper rod assembly 750 can be coupled to the tundish 740 and selectively block an outlet 842 of the tundish 740 to control flow therethrough. The tundish 740 can be positioned directly above the granulation reactor 760, which can have a wide opening at its upper portion to receive the molten metallics from the outlet 842 of the tundish 740. The granulation reactor 760 can receive cool water from the cooling system 140 (FIGS. 1 and 2) and can output heated water to one or more hot well pumps 762.

The granulator unit 130 can further include an ejector 770, a dewatering assembly 780, and a classifier assembly 790. The ejector 770 can extend between an outlet of the granulation reactor 760 and an inlet of the dewatering assembly 780. The dewatering assembly 780 can dry the granulated products from the granulation reactor 760 to output GMUs. The classifier assembly 790 can receive filtrate from the dewater assembly 780 and output fines. The remaining filtrate can be sent to a sump pump 764. As best seen in FIG. 7, the dewatering assembly 780 and the classifier assembly 790 can be arranged laterally. This is different from conventional arrangements in which the classifier assembly is positioned below the dewatering assembly to directly receive filtrate falling therefrom. In embodiments of the present technology, the classifier assembly 790 can receive the filtrate from the dewatering assembly 780 via a pipe extending therebetween (not shown in FIGS. 7-9). Further details of the various components of the granulation unit 130 and their operation are described below with reference to FIGS. 10-21.

As shown in FIGS. 8 and 9, the granulator unit 130 can further include an overhead crane 852. The overhead crane 852 can be operable to lift, lower, and/or transport the various components of the granulator unit 130 described above. As described in further detail below, the various components can include trunnions or lifting lugs that the overhead crane 852 can hook onto for lifting. The overhead crane 852 provides a safe and efficient way to reposition or replace various components of the granulator unit 130.

Figure 10:
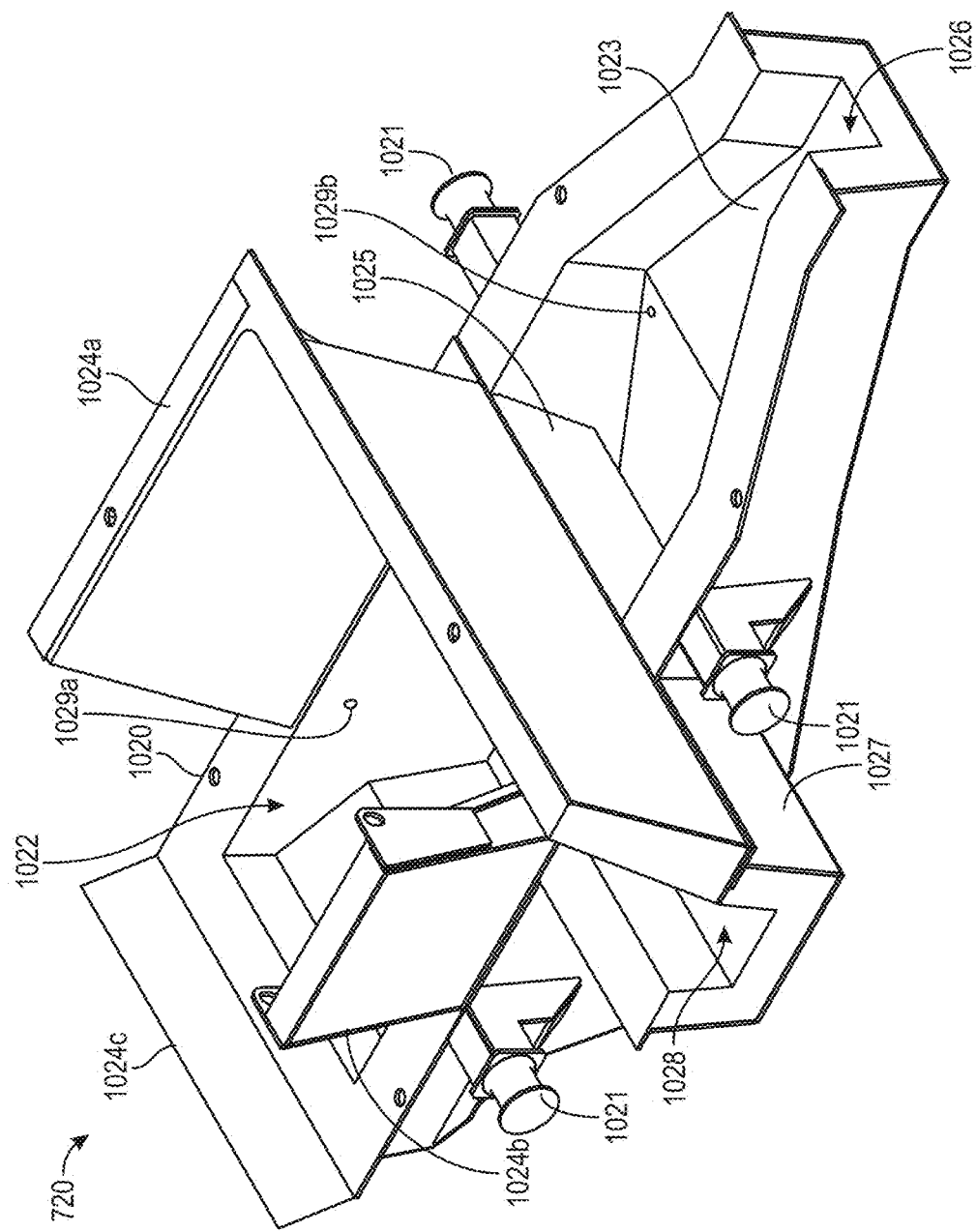
FIGS. 10, 11, and 12 are perspective, side, and top views, respectively, of a runner configured in accordance with embodiments of the present technology.
Figure 11:
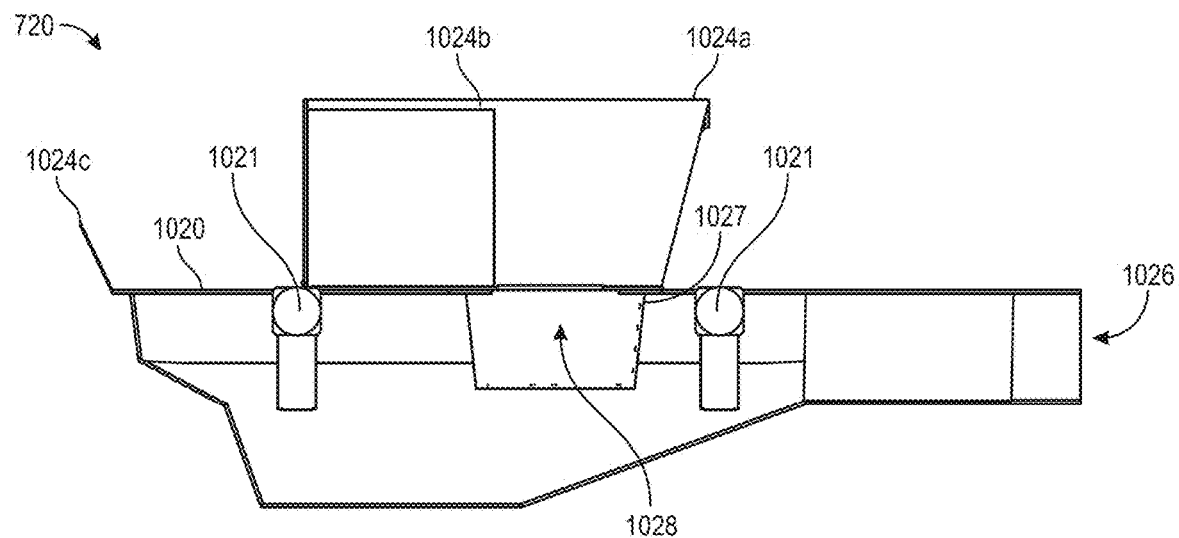
Figure 12:
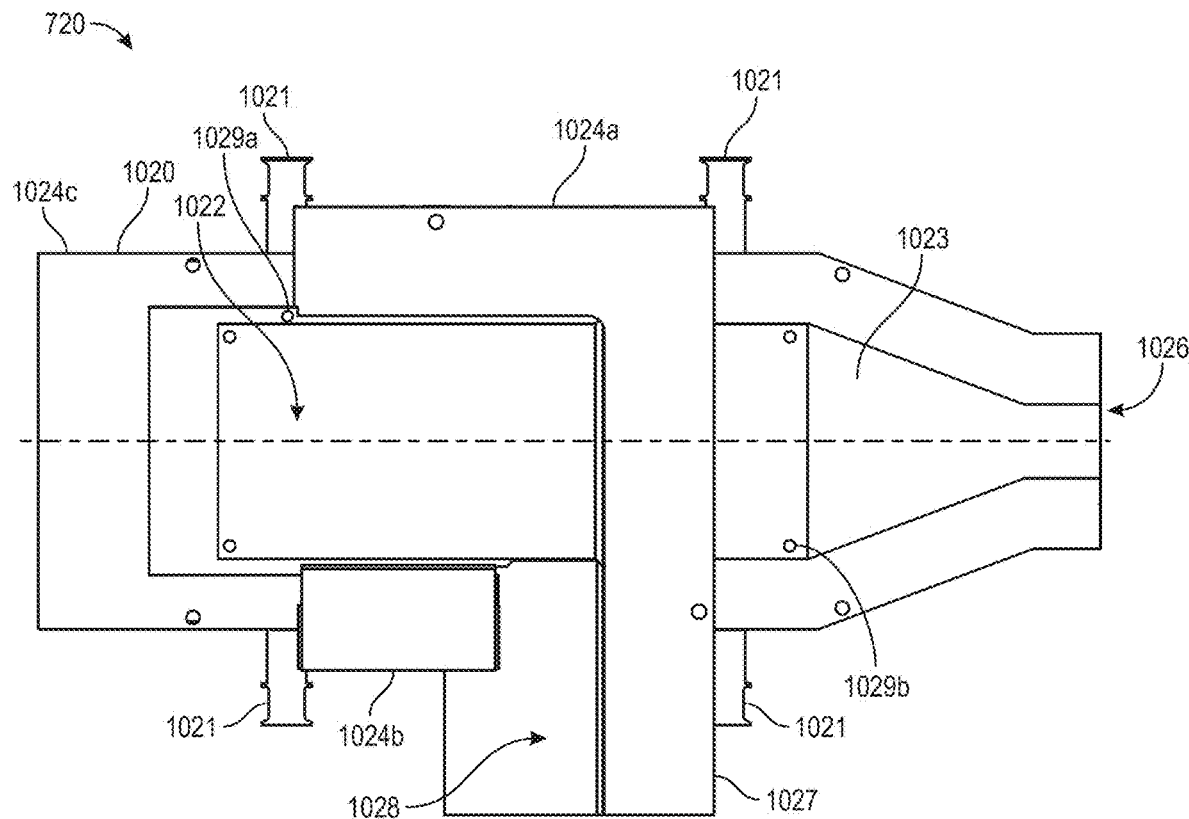

FIGS. 10, 11, and 12 are perspective, side, and top views, respectively, of the runner 720 configured in accordance with embodiments of the present technology. The runner 720 can include a runner body 1020, one or more splash shields (individually labeled 1024a, 1024b, 1024c, collectively referred to as "the splash shields 1024") coupled to an upper portion of the runner body 1020, and an overflow channel 1027 removably coupled to a side portion of the runner body 1020. The runner body 1020 can define a cavity that can receive and pool molten metallics therein. More specifically, the cavity can have an open top 1022 near the rear of the runner body 1020 that receives the stream of molten metallics from the torpedo car 502, and an outlet 1026 at a front end of the runner body 1020. As best seen in FIG. 11, the cavity can have a maximum depth underneath the open top 1022 and a shallower depth closer to and along the outlet 1026. The inner surface of the runner body 1020 defining the cavity can be lined with a lining material 1023 such as refractory lining, silicas, aluminas, material not containing magnesium, and/or other suitable lining. For example, the lining material 1023 can be the same or a similar material as the sacrificial refractory lining included in the BF 412.

In some embodiments, the runner 720 additionally includes one or more flow control devices 1025 (e.g., a ferrostatic head flow control device) coupled to sidewalls of the runner body 1020 and extending at least partially into the cavity (e.g., extending downward, upward, sideways). The flow control device 1025 can be a static structure or an adjustable structure whose position and/or orientation relative to the runner body 1020 can be controlled. In some embodiments, the flow control device 1025 comprises a solid plate. In some embodiments, the flow control device 1025 comprises a plate with one or more holes extending therethrough at one or more angles and/or arranged in an array. Although FIG. 10 illustrates the runner 720 having a single flow control device 1025, a plurality of flow control devices of the same or varying shapes, structures, and/or dimensions can be included. In some embodiments, the runner 720 further includes a level sensor 1029*a* mounted on a sidewall of the runner body 1020 and/or one or more load sensors 1029*b* mounted on the bottom surface of the runner body 1020. Furthermore, the runner 720 can include a plurality of trunnions or lifting lugs 1021 coupled to and extending outward from the sidewalls of the runner body 1020.

The splash shields 1024 can be positioned to prevent molten metallics from splashing and spilling out of the runner 720, which can otherwise lead to significant material loss. In the illustrated embodiment, a first splash shield 1024*a* has a generally L-shaped form factor that extends at least partially across one side of the runner body 1020 and the middle of the runner body 1020 along the front edge of the overflow channel 1027. A second splash shield 1024*b* extends at least partially across the other side of the runner body 1020. A third splash shield 1024*b* extends at least partially across a rear side of the runner body 1020. Thus, the splash shields 1024 can at least partially surround the open top 1022 that receives the stream of molten metal. Each of the splash shields 1024 can include refractory lining (illustrated with patterning in FIGS. 10-12) to protect the underlying structure from the hot molten metal. Each of the splash shields 1024 can also be angled outward and away from the center of the runner body 1020 to define a generally funnel-shaped space for receiving the stream of molten metal.

The overflow channel 1027 can define an overflow outlet 1028 through which excess material can flow out of the runner 720. As best seen in FIG. 11, the overflow outlet 1028 can be positioned higher than the outlet 1026 so that the molten metallics primarily flows out of the runner 720 via the outlet 1026. The overflow channel 1027 can be removably coupled to the runner body 1020 via, e.g., bolts and/or other fasteners. Advantageously, when the runner 720 is transported to a cleaning/repair area, the overflow channel 1027 can be detached from the runner body 1020 to facilitate handling. For example, the cleaning/repair area may include a machine that can flip the runner 720 upside down, and detaching the overflow channel 1027 can make it easier to place the runner 720 on the machine.

In operation, the open top 1022 of the runner 720 receives the stream of molten metallics flowing out of the torpedo car 502. The splash shields 1024 can prevent a significant amount of any molten metallics that splashes from spilling over the side or rear of the runner body 1020. As the molten metallics pools in the cavity, the level sensor 1029*a* can measure the surface level of the molten metallics and the load sensors 1029*b* can measure the weight of the molten metallics in the cavity. In some embodiments, the readings from the level sensor 1029*a* and/or the load sensors 1029*b* are transmitted to the torpedo controller 712 (FIGS. 7-9) so that the tilt angle of the torpedo car 502 can be controlled to achieve a desired flow rate at any given time. For example, if the level sensor 1029*a* and/or the load sensors 1029*b* indicate that there is too much molten metal, the torpedo controller 712 can reduce the tilt angle until, e.g., the level sensor 1029*a* and/or the load sensors 1029*b* indicate that a sufficient amount of molten metallics has flowed out through the outlet 1026 and/or the overflow outlet 1028 and the torpedo car 502 can be tilted more.

The flow control devices 1025 can serve multiple functions. First, the flow control device 1025 can contain agitation of the molten metallics at the rear side of the runner 720. As molten metallics are transferred (e.g., poured) from the torpedo car 502, the stream can cause splashing, waves, and other forms of turbulent flow at around the open top 1022. The flow control device 1025 can act as a barrier that blocks the agitation (including bubbles and/or foam created therefrom) from crossing over towards the outlet 1026. In some embodiments, the flow control device 1025 is controllable to adjust a height thereof. As a result, the flow of molten metallics exiting the runner 720 via the outlet 1026 can be relatively calm and/or laminar. Second, the flow control device 1025 can act as a barrier that blocks slag or other impurities floating on or near the surface of the molten metallics from cross over towards the outlet 1026. The slag that builds up at the open top 1022 can be skimmed off the surface or eventually directed out of the runner 720 via the overflow outlet 1028. As a result, the flow of molten metallics exiting the runner 720 via the outlet 1026 can be relatively devoid of slag. Third, the flow control device 1025 can act as a vortex breaker that can prevent or at least impede the formation of vortices in the molten metallics. It is appreciated that the runner 720 can include a plurality of the flow control devices 1025, and different ones of the flow control devices 1025 can have different shapes and/or dimensions, and/or extend in different directions to provide the various functions described herein.

In the illustrated embodiment, the runner 720 includes a total of four lifting lugs 1021, as best seen in FIG. 12. The overhead crane 852 (FIGS. 8 and 9) can be operated to lift, lower, and/or transport the runner 720 using the lifting lugs 1021. For example, the overhead crane 852 can be used to reposition the runner 720 at a lower or higher height to increase or decrease the distance between the runner 720 and other components of the granulator unit 130. In another example, the overhead crane 852 can be used to remove the runner 720 from the granulator unit 130 for, e.g., maintenance. Because the system 100 is a continuous system and there may not be a conventional "downtime" during which components may undergo maintenance on-site, the ability to quickly and easily transport the runner 720 for maintenance or replacement can be important to ensure that the system 100 remains continuous.

Figure 13:
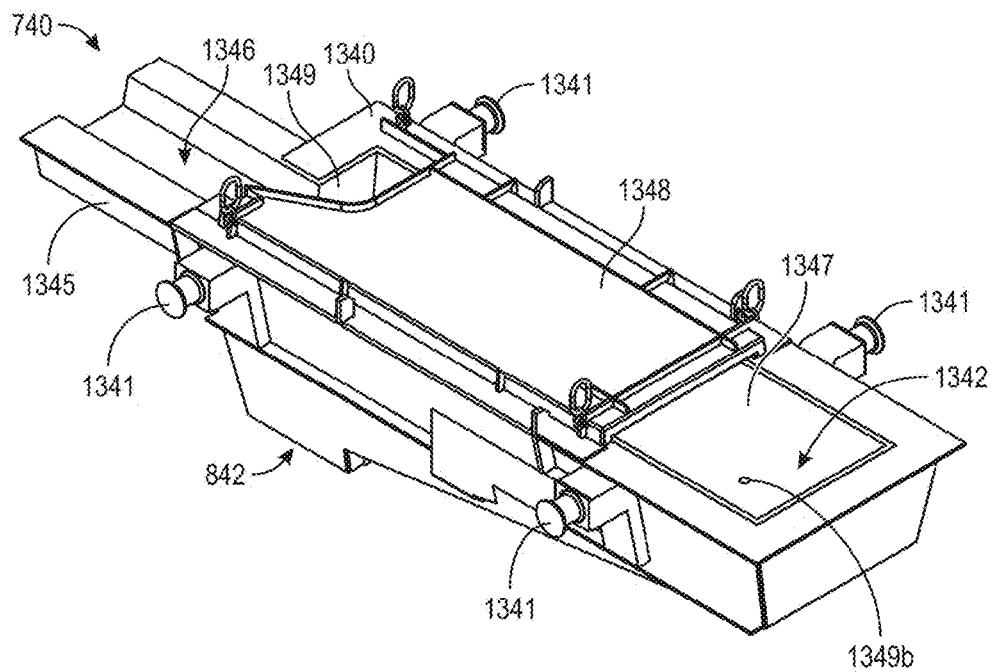
FIGS. 13, 14A, and 14B are front perspective, rear perspective, and side cross-sectional views, respectively, of a tundish configured in accordance with embodiments of the present technology.
Figure 14A:
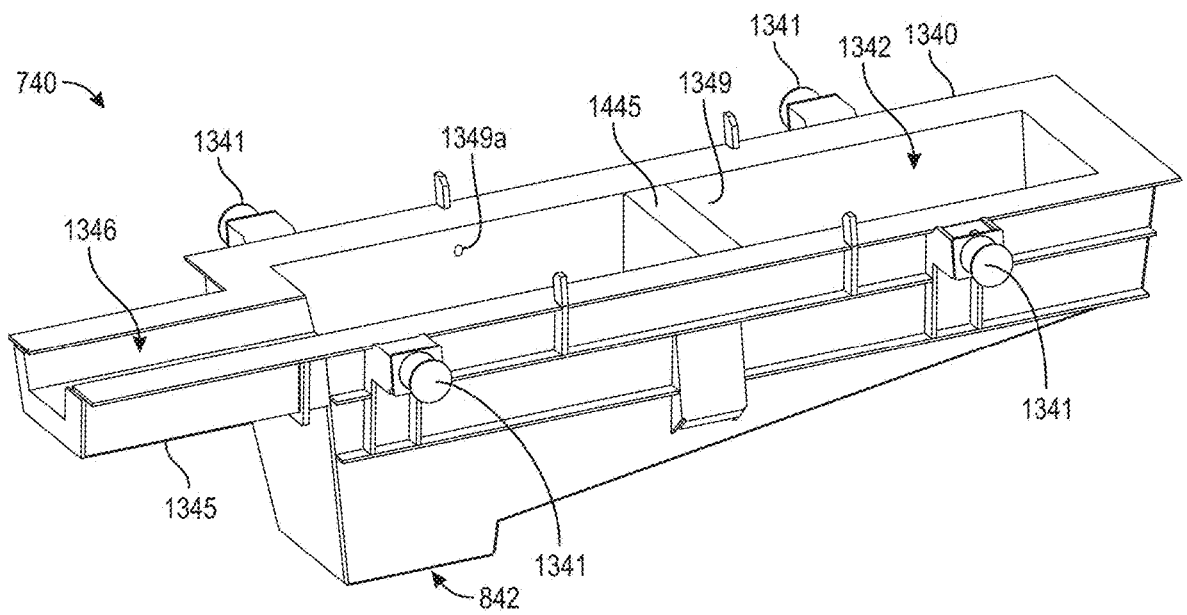
Figure 14B:
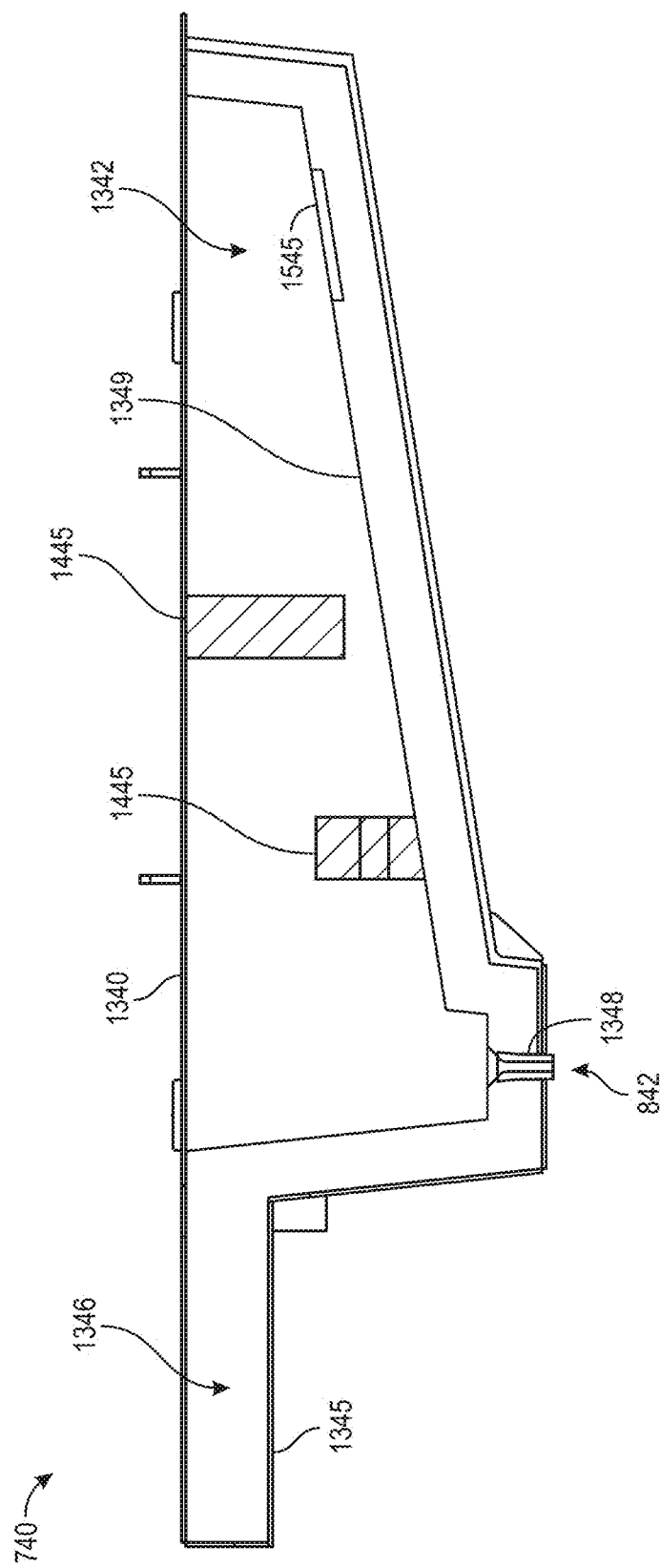

FIGS. 13, 14A, and 14B are front perspective, rear perspective, and side cross-sectional views, respectively, of the tundish 740 configured in accordance with embodiments of the present technology. The tundish 740 can include a tundish body 1340, a cover 1348 disposed at least partially over the tundish body 1340, and an overflow channel 1345 removably coupled to a front portion of the tundish body 1340. The tundish body 1340 can define a cavity that can receive and pool molten metallics therein. More specifically, the cavity can have an open top 1342 near the rear of the tundish body 1340 that is not covered by the cover 1348 and receives the stream of molten metallics from the outlet 1026 of the runner 720, and the outlet 842 at lowest portion of the tundish body 1340 and near a front end of the tundish body 1340. As best seen in FIG. 14B, the tundish body 1340 can have an angled bottom surface such that the molten metallics flows down toward the outlet 842. In some embodiments, the tundish 740 further includes a nozzle 1343 at the outlet 842 to ensure that the molten metallics flows out of the outlet 842 in a controlled manner. The nozzle 1343 can comprise silica carbide, graphite, non-wetting materials, and/or other suitable material. In some embodiments, the nozzle 1343 can be vibrating. The inner surface of the tundish body 1340 defining the cavity can be lined with a liner material 1347 such as refractory lining, silicas, aluminas, material not containing magnesium, and/or other suitable lining. For example, the lining material 1347 can be the same or a similar material as the sacrificial refractory lining included in the BF 412. A portion of the bottom surface of the tundish body 1340 directly below the open top 1342 can be covered with an impact pad 1447 (FIG. 14B) that can absorb the impact of the stream of molten metallics transferred (e.g., poured) from the runner 720.

In some embodiments, the tundish 740 additionally includes one or more flow control devices 1445 (e.g., a ferrostatic head flow control device) coupled to sidewalls of the tundish body 1340 and extending at least partially into the cavity (e.g., downward, upward, sideways). The flow control devices 1445 can be generally similar in structure and function as the flow control device 1025 included in the runner 720. The flow control device 1445 can be a static structure or an adjustable structure whose position and/or orientation relative to the tundish body 1340 can be controlled. In some embodiments, the flow control device 1445 comprises a solid plate. In some embodiments, the flow control device 1445 comprises a plate with one or more holes extending therethrough at one or more angles and/or arranged in an array. In some embodiments, the tundish 740 further includes a level sensor 1349a mounted on a sidewall of the tundish body 1340 and/or one or more load sensors 1349b mounted on the bottom surface of the tundish body 1340. Furthermore, the tundish 740 can include a plurality of trunnions or lifting lugs 1341 coupled to and extending outward from the sidewalls of the tundish body 1340.

The cover 1348, shown in FIG. 13 but omitted in FIGS. 14A and 14B to avoid obscuring certain details of the tundish 740, can be positioned to prevent molten metallics from splashing and spilling out of the tundish 740, which can otherwise lead to significant material loss. As shown in FIG. 13, the cover 1348 can be shaped and sized to leave the open top 1342 near the rear end of the tundish 740 exposed for receiving the stream of molten metallics from the runner 720. The cover 1348 can include refractory lining (illustrated with patterning in FIG. 13) to also prevent other materials (e.g., splashed molten metallics or slag from the runner 720) from entering the tundish 740 outside of the open top 1342. Towards the front end of the tundish 740, the cover 1348 can have a curved edge 1349, exposing a portion of the cavity directly above the outlet 842. In some embodiments, the stopper rod assembly 750 can be coupled to the front portion of the tundish 740 such that the stopper rod assembly 750 can extend into the portion of the cavity exposed by the curved edge 1349 and reach the outlet 842. It will be appreciated that the cover 1348 can have other shapes and/or sizes to provide spilling prevention while allowing the stopper rod assembly 750 access to the outlet 842.

The overflow channel 1345 can define an overflow outlet 1346 through which excess material can flow out of the tundish 740. As best seen in FIG. 14B, the overflow outlet 1346 can be positioned higher than the outlet 842 so that the molten metallics primarily flows out of the tundish 740 via the outlet 842. The overflow channel 1345 can be removably coupled to the tundish body 1340 via, e.g., bolts and/or other fasteners. Advantageously, when the tundish 740 is transported to a cleaning/repair area, the overflow channel 1345 can be detached from the tundish body 1340 to facilitate handling. For example, the cleaning/repair area may include a machine that can flip the tundish 740 upside down, and detaching the overflow channel 1345 can make it easier to place the tundish 740 on the machine.

In operation, the open top 1342 of the tundish 740 receives the stream of molten metallics flowing out of the runner 720. The cover 1348 can help ensure that only the stream of molten metallics enters the tundish 740 and can prevent splashes from spilling over the sides of the tundish body 1340. After the stream of molten metallics hits the impact pad 1447, the molten metallics can flow downward toward the outlet 842 and eventually pool in the cavity. The level sensor 1349a can measure the surface level of the molten metallics and the load sensors 1349b can measure the weight of the molten metallics in the cavity. In some embodiments, the readings from the level sensor 1349a and/or the load sensors 1349b are transmitted to the torpedo controller 712 (FIGS. 7-9) so that the tilt angle of the torpedo car 502 can be controlled to achieve a desired flow rate at any given time. For example, if the level sensor 1349a and/or the load sensors 1349b indicate that there is too much molten metal, the torpedo controller 712 can reduce the tilt angle until, e.g., the level sensor 1349a and/or the load sensors 1349b indicate that a sufficient amount of molten metallics has flowed out through the outlet 842 and/or the overflow outlet 1346 and the torpedo car 502 can be tilted more.

Like the flow control device 1025, the flow control devices 1445 can serve three primary functions. First, the flow control device 1445 can contain agitation of the molten metallics at the rear side of the tundish 740. As molten metallics are transferred (e.g., poured) from the runner 720, the stream can cause splashing, waves, and other forms of turbulent flow at around the open top 1342. The flow control device 1445 can act as a barrier that blocks the agitation from crossing over towards the outlet 842. In some embodiments, the flow control device 1445 is controllable to adjust a height thereof. As a result, the flow of molten metallics exiting the tundish 740 via the outlet 842 can be relatively calm and/or laminar. Second, the flow control device 1445 can act as a barrier that blocks slag or other impurities floating on or near the surface of the molten metallics from cross over towards the outlet 842. The slag that builds up at the open top 1342 can be skimmed off the surface or eventually directed out of the tundish 740 via the overflow outlet 842. As a result, the flow of molten metallics exiting the tundish 740 via the outlet 842 can be relatively devoid of slag. Third, the flow control device 1445 can act as a vortex breaker that can prevent or at least impede the formation of vortices in the molten metallics. It is appreciated that the tundish 740 can include a plurality of the flow control devices 1445, and different ones of the flow control devices 1445 can have different shapes and/or dimensions, and/or extend in different directions to provide the various functions described herein.

In the illustrated embodiment, the tundish 840 includes a total of four lifting lugs 1341, as best seen in FIGS. 13 and 14A. The overhead crane 852 (FIGS. 8 and 9) can be operated to lift, lower, and/or transport the tundish 740 using the lifting lugs 1341. For example, the overhead crane 852 can be used to reposition the tundish 740 at a lower or higher height to increase or decrease the distance between the tundish 740 and other components of the granulator unit 130. In another example, the overhead crane 852 can be used to remove the tundish 740 from the granulator unit 130 for, e.g., maintenance. Because the system 100 is a continuous system and there may not be a conventional "downtime" during which components may undergo maintenance on-site, the ability to quickly and easily transport the tundish 740 for maintenance or replacement can be important to ensure that the system 100 remains continuous.

Figure 15:
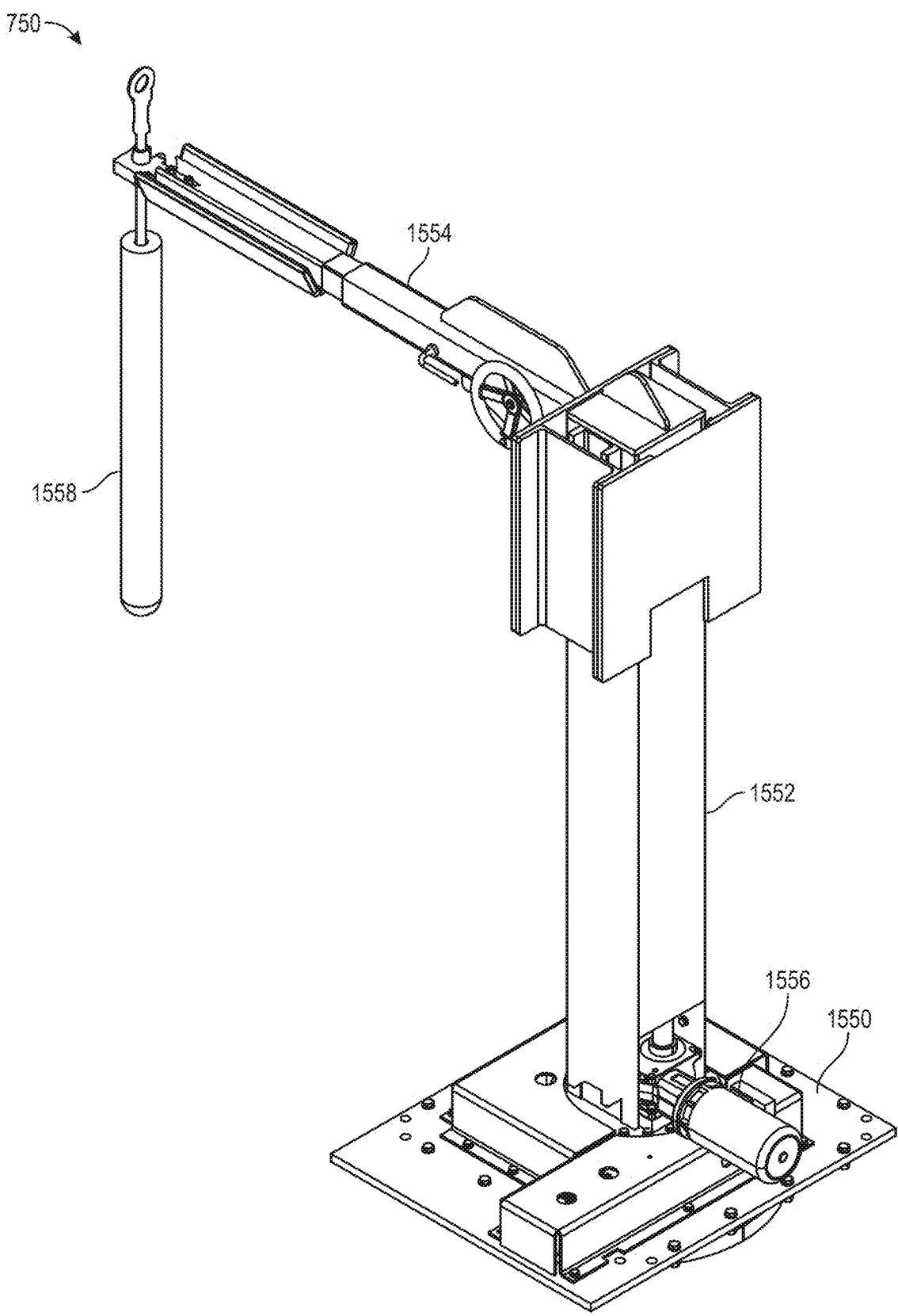
FIG. 15 is a perspective view of a stopper rod assembly configured in accordance with embodiments of the present technology.

FIG. 15 is a perspective view of the stopper rod assembly 750 configured in accordance with embodiments of the present technology. The stopper rod assembly 750 can include a base plate 1550, a vertical member 1552 extending vertically from the base plate 1550, a horizontal member 1554 extending horizontally from the vertical member 1552, a motor 1556 operably coupled to the vertical member 1552 and/or the horizontal member 1554, and a stopper rod 1558 extending downward from a distal tip of the horizontal member 1554. The base plate 1550 can be coupled to the tundish 740, e.g., bolted to the tundish body 1340. The stopper rod 1558 can be shaped and sized to fit in the outlet 842 and/or the nozzle 1343 of the tundish 740. In some embodiments, the stopper rod 1558 includes refractory lining or other suitable lining to protect the stopper rod 1558 from the hot molten metal. In operation, a controller (not shown) can be used to operate the motor 1556 to move the horizontal member 1554, and thus the stopper rod 1558, vertically along the length of the vertical member 1552. Therefore, the stopper rod 1558 can be remotely controlled to selectively plug the outlet 842 of the tundish 740 and thereby control the flow of molten metallics out of the tundish 740.

Figure 16:
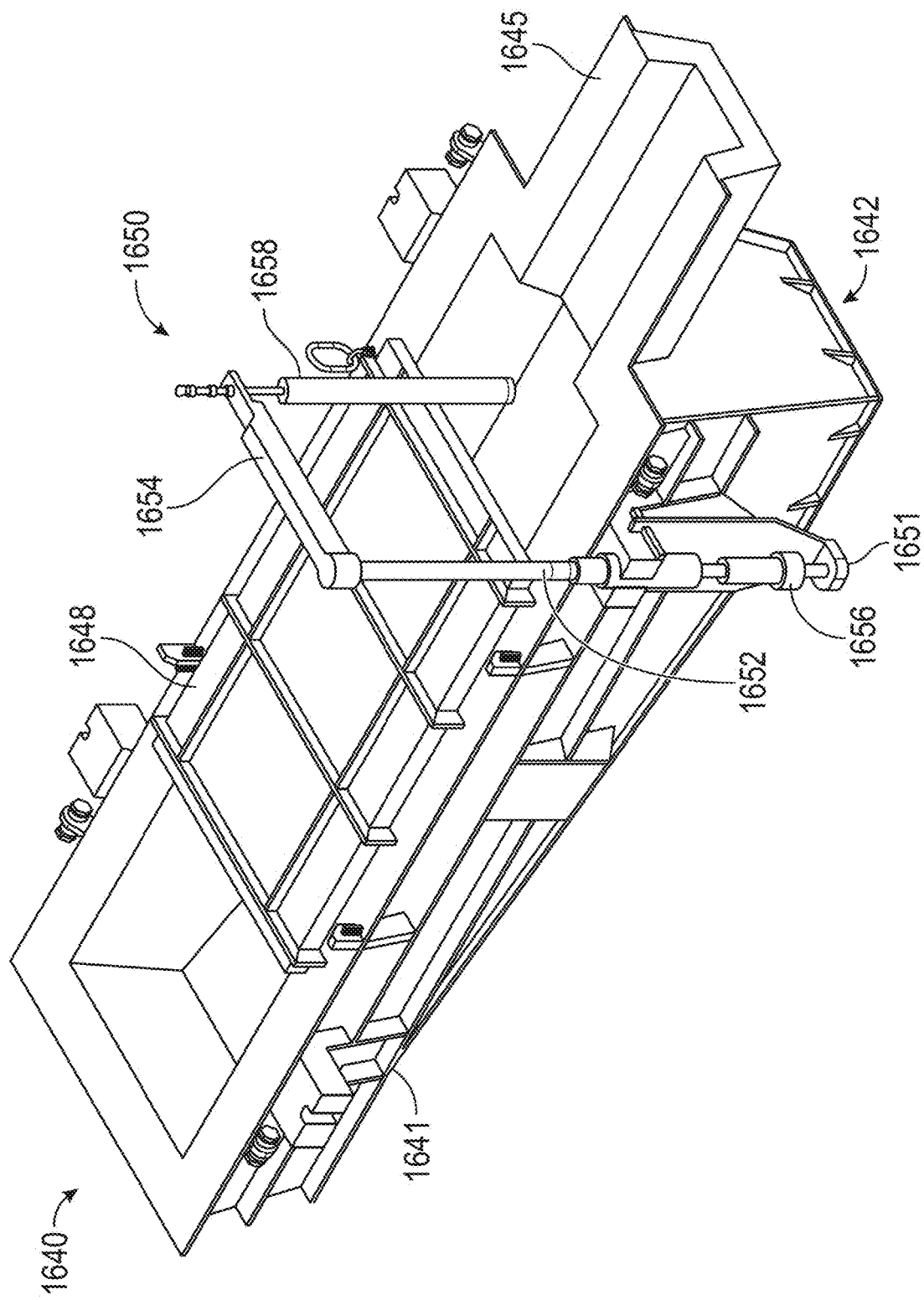
FIG. 16 is a perspective view of a tundish and a stopper rod assembly assembled together and configured in accordance with embodiments of the present technology.

FIG. 16 is a perspective view of a tundish 1640 and a stopper rod assembly 1650 assembled together and configured in accordance with embodiments of the present technology. It is appreciated that while FIG. 16 illustrates different embodiments of a tundish and stopper rod assembly than FIGS. 13-15, the tundish 740 and the stopper rod assembly 750 illustrated in FIGS. 13-15 can be assembled together in a similar manner. In the illustrated embodiment, the tundish 1640 includes a tundish body 1641, a cover 1648 disposed over the tundish body 1641, and an overflow channel 1645 removably coupled to the front of the tundish body 1641. The stopper rod assembly 1650 can include a mounting frame 1651, an actuator 1656 (e.g., a linear actuator) secured to the mounting frame 1651, a vertical member 1652 coupled to and extending upward from the actuator 1656, a horizontal member 1654 extending horizontally from the upper tip of the vertical member 1652, and a stopper rod coupled to and extending downward from the distal tip of the horizontal member 1654. As shown, the mounting frame 1651 can be attached to an outer side wall of the tundish body 1641 via fasteners, brackets, or other coupling mechanisms. More specifically, the mounting frame 1651 can be secured at a position aligned with an outlet 1642 of the tundish 1640. The horizontal member 1654 can extend over the sidewall of the tundish body 1641 such that the stopper rod 1658 hangs directly above the outlet 1642.

In operation, the actuator 1656 can move the vertical member 1652 between a raised position (illustrated in FIG. 16) and a lowered position. When the vertical member 1652 is in the raised position, the stopper rod 1658 is spaced apart from the outlet 1642, allowing molten metallics to flow out through the outlet 1642. When the vertical member 1652 is in the lowered position, the stopper rod 1658 can at least partially plug the outlet 1642 to impede flow of molten metallics therethrough. One of ordinary skill in the art will appreciate that the actuator 1656 can be precisely controlled to adjust the position of the stopper rod 1658 to various heights between the raised and lowered positions to plug the outlet 1642 by varying degrees. Therefore, the actuator 1656 can be controlled to provide varying levels of flow control through the outlet 1642 of the tundish 1640.

Advantageously, attaching the stopper rod assembly 1650 directly to the tundish 1640 as opposed to, e.g., a frame structure supporting the tundish 1640, can increase safety levels during operation. For example, if the stopper rod 1658 becomes stuck in the outlet 1642 or elsewhere, the tundish 1640 and the stopper rod assembly 1650 can be removed together for repair. If the stopper rod assembly 1650 were attached to another structure (e.g., a frame structure that cannot be easily removed from the on-site location), it can be difficult and unsafe to separate the tundish 1640 and the stopper rod assembly 1650 at the on-site location.

Figure 17:
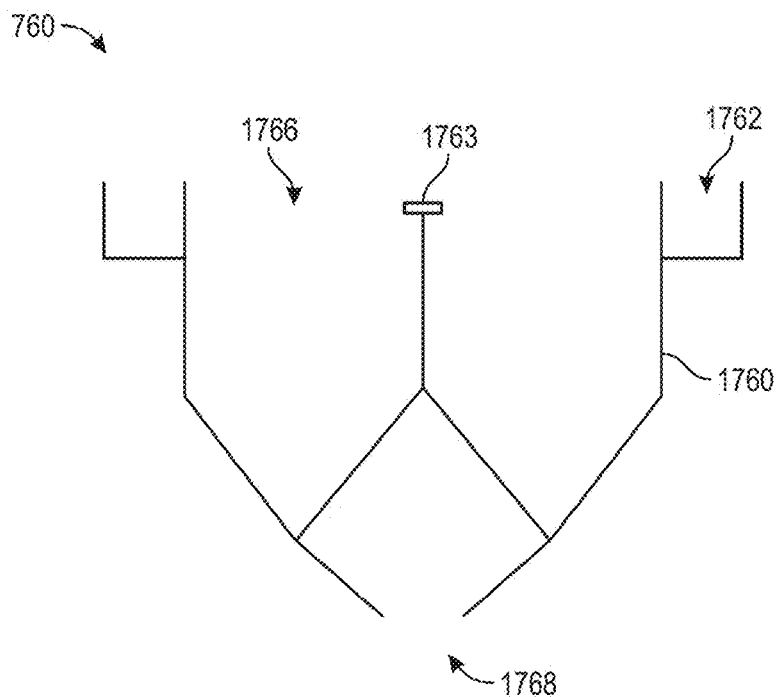
FIG. 17 is a schematic cross-sectional view of a granulation reactor configured in accordance with embodiments of the present technology.

FIG. 17 is a schematic cross-sectional view of the granulation reactor 760 configured in accordance with embodiments of the present technology. The granulation reactor 760 can include a reactor body 1760 and a spray head or target 1763 coupled to the reactor body 1760. The reactor body 1760 can define a cavity 1766 therein and an overflow channel 1762 extending around the upper portion of the cavity 1766. As illustrated, the cavity 1766 and the overflow channel 1762 can be open at the top to receive material from above. More specifically, the cavity 1766 can be positioned to receive the molten metallics flowing out of the tundish 740 through the outlet 842 and the nozzle 1343. The reactor 760 can include an outlet 1768 of the cavity 1766 at the lower portion of the reactor body 1760. The overflow channel 1762 can be positioned to receive overflow material (e.g., molten metallics mixed with slag) from the runner 720 and the tundish 740. For example, the lengths of the overflow channel 1027 (of the runner 720) and the overflow channel 1345 (of the tundish 740) can be set so that overflow materials flow down into the overflow channel 1762 (of the granulation reactor 760). The overflow materials received in the overflow channel 1762 can be removed via an outlet and sent to further processing. In some embodiments, the granulation reactor 760 further includes lifting lugs coupled to the reactor body 1760 for facilitating lifting of the granulation reactor 760 by the overhead crane 852.

The target 1763 can be secured at the center of the cavity 1766. For example, in some embodiments, the target 1763 is secured via one or more struts extending from the reactor body 1760 (e.g., like a tripod). Cooled water can enter the cavity 1766 via the reactor body 1760 and be pooled and/or circulated therein.

In operation, the granulation reactor 760 can continuously or intermittently receive cooled water from the cooling system 140 and at least partially fill the cavity 1766 with the cooled water. The volumetric capacity of the cavity 1766 can be between 10,000-100,000 gallons or between 20,000-40, 000 gallons. The molten metallics flowing down from the tundish 740 can impact the target 1763. The target 1763 can be shaped and sized to spray the molten metallics into different directions. The molten metallics that enters the cooled water is cooled and becomes granulated. One of ordinary skill in the art will appreciate that the falling distance between the tundish 740 and the target 1763 can affect the shape, size, and quality of the resulting granulated products. As discussed above, the overhead crane 852 can adjust the height of the tundish 740 relative to the target 1763 to produce granulated products with desired properties (e.g., shape, size, quality). The formed granulated products can exit the granulation reactor 760 via the outlet 1768.

Figure 18A:
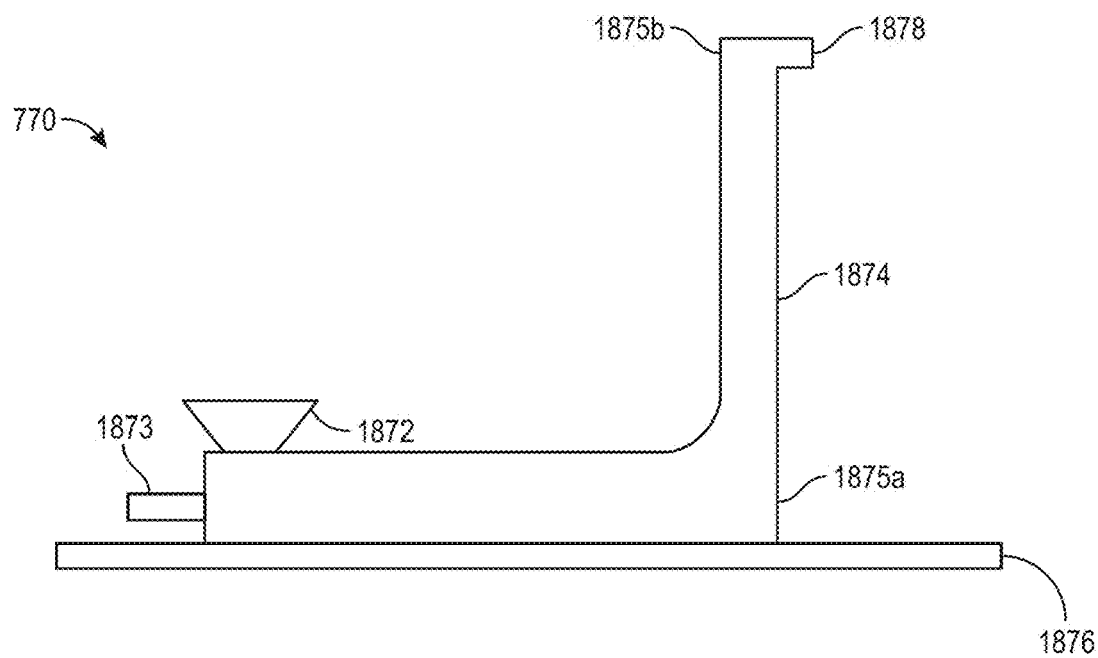
FIGS. 18A and 18B are schematic side and enlarged, side cross-sectional views, respectively, of an ejector configured in accordance with embodiments of the present technology.
Figure 18B:
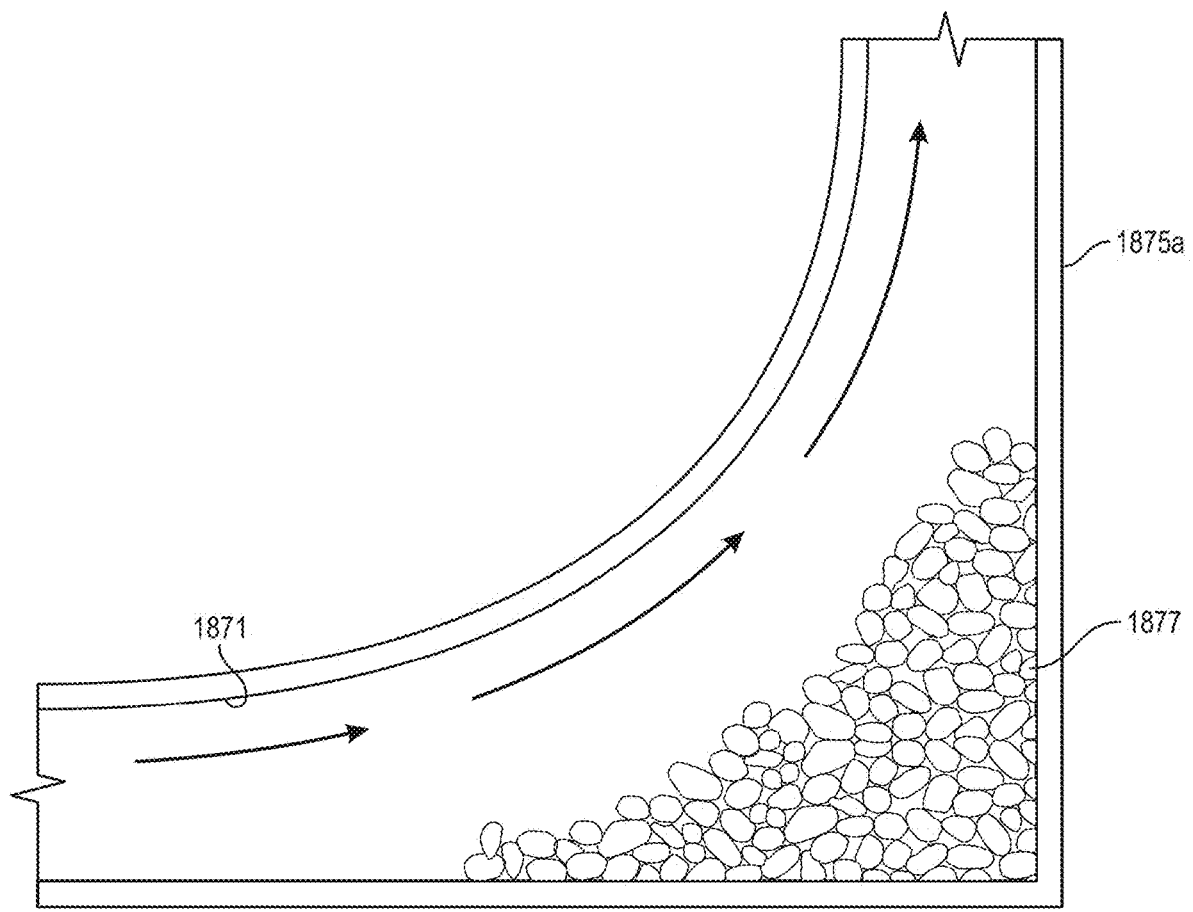

FIGS. 18A and 18B are schematic side and enlarged, side cross-sectional views, respectively, of the ejector 770 configured in accordance with embodiments of the present technology. Referring first to FIG. 18A, the ejector 770 can include an inlet 1872 and a jet inlet 1873, and the ejector 770 can be coupled to a lift line 1874 having a first rock box 1875*a*, a second rock box 1875*b*, and an outlet 1878. The inlet 1872 can be positioned at the outlet 1768 of the granulation reactor 760 to receive the granulated products therefrom. In the illustrated embodiment, the inlet 1872 has a funnel shape generally corresponding to the shape of the lower portion of the reactor body 1760. The jet inlet 1873 can be coupled to receive a water jet stream and/or a stream of compressed air, which can provide enough pressure to push the granulated products up the lift line 1874. In the illustrated embodiment, the ejector 770 and the lift line 1874 are mounted on rails 1876, which allow the ejector 770 and the lift line 1874 to be easily removed from the granulator unit 130 for maintenance, contributing to the modularity of the granulator unit 130.

Referring next to FIG. 18B, which illustrates an enlarged, side cross-sectional view of the first rock box 1875*a*, the first rock box 1875*a* can be internally connected to the lift line 1874 where the lift line 1874 changes angle. In other words, the first rock box 1875*a* serves as an extended corner space or dead zone for the lift line 1874. In operation, as the granulated products from the granulation reactor 760 and the water and/or compressed air streams flow through the lift line 1874, the first rock box 1875*a* can collect granules 1877. The granules 1877 can remain in the corner of the first rock box 1275*a* by virtue of the fluid velocity and pressure. Thus, the first rock box 1875*a* can help reduce wear and tear on the lift line 1874 by managing the impact and abrasion caused by the granulated products changing direction, and the buildup of the granules 1877 can act as a buffer to absorb the impact of incoming material and reduce the velocity of the flow. In some embodiments, the lift line 1874 is lined with a liner material 1871 such as ceramic, silicon carbide, titanium, tungsten carbide, and/or other suitable material.

Figure 19:
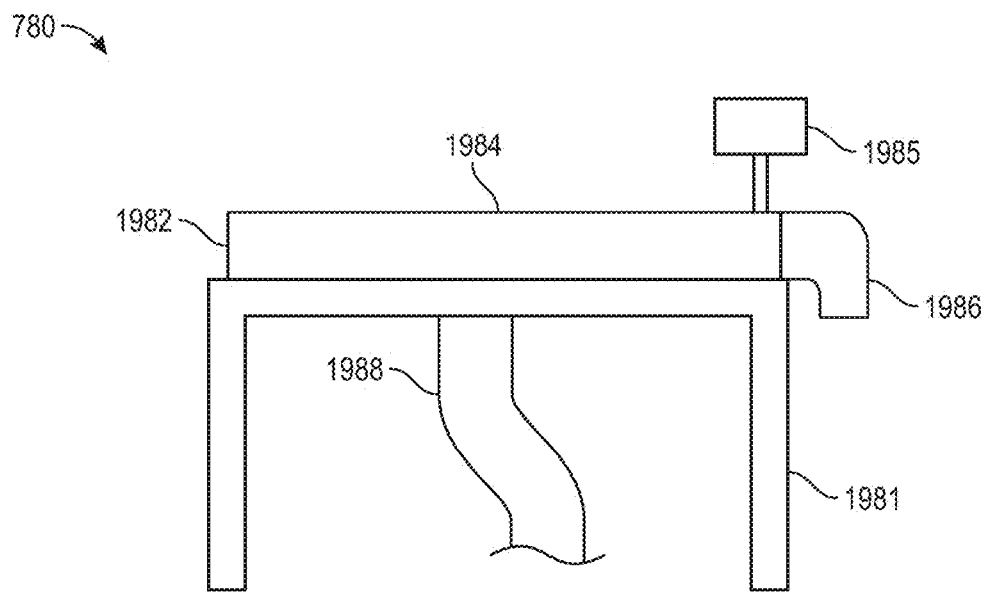
FIG. 19 is a schematic side view of a dewatering assembly configured in accordance with embodiments of the present technology.

FIG. 19 is a schematic side view of the dewatering assembly 780 configured in accordance with embodiments of the present technology. The dewatering assembly 780 can include a frame structure 1981, a dewatering screen 1984 supported on the frame structure 1981, and an imaging device 1985 positioned to capture images of the products on the dewatering screen 1984. The outlet 1878 of the lift line 1874 can couple to an inlet 1982 of the dewatering assembly 780 so that the dewatering screen 1984 can receive wet granulated products from the granulation reactor 760 via the ejector 770. The dewatering assembly 780 can further include an outlet chute 1986 at the end of the dewatering screen 1984 so that the screened products can be collected separately.

In operation, as the granulated products from the lift line 1874 move from the inlet 1982 to the outlet chute 1986, the dewatering screen 1984 can filter out water and particles below a threshold size. The threshold size can be between 0.1-10 mm, such as about 0.1 mm, 1 mm, 2 mm, 3 mm, 4 mm, 5 mm, 6 mm, 7 mm, 8 mm, 9 mm, or 10 mm. The filtered out particles can be directed to the classifier assembly 790 via a pipe 1988 underneath the dewatering screen 1984, and the products that reach the outlet chute 1986 can form the GMU products. In some embodiments, the imaging device 1985 can be used to perform optical granulometry, which involves visually inspecting the size distribution of the particles. If the particles are generally smaller than expected or desired, this may be an indication that the flow rate of the molten metallics is too fast. Accordingly, the images taken by the imaging device 1985 can be used in a feedback loop with components of the system 100 that manage flow rate, such as (i) the torpedo controller 712 for controlling the tilt angle of the torpedo car 502, (ii) controllers for adjusting the position of the flow control devices 1025 in the runner 720 and/or the flow control devices 1445 in the tundish 740, (iii) the motor 1556 or the actuator 1656 for adjusting the height of the stopper rod 1558 or 1658, and/or (iv) the overhead crane 852 for adjusting the height of the runner 720 and/or the tundish 740 relative to the granulation reactor 760.

Figure 20:
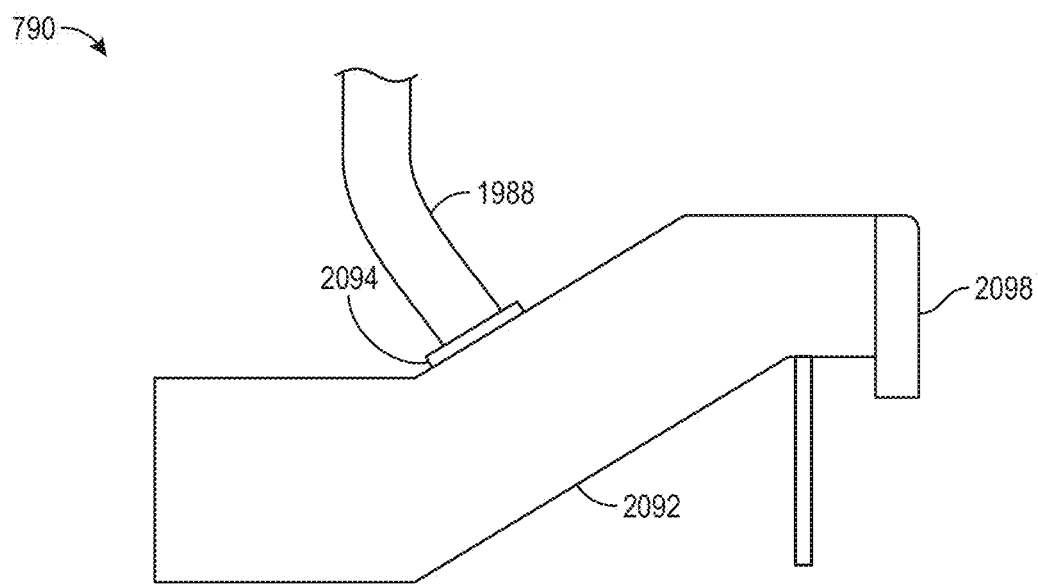
FIG. 20 is a schematic side view of a classifier assembly configured in accordance with embodiments of the present technology.

FIG. 20 is a schematic side view of the classifier assembly 790 configured in accordance with embodiments of the present technology. The classifier assembly 790 can include a housing 2092 having an inlet 2094 that can couple to the pipe 1988 and an outlet chute 2098. In operation, the inlet 2094 can receive the slurry (e.g., water and GMU fines) from the dewatering assembly 780 via the pipe 1988. The GMU fines can be separated and released through the outlet chute 2098 to be collected separately. The remaining water can be directed to, e.g., the sump pump 764.

Figure 21:
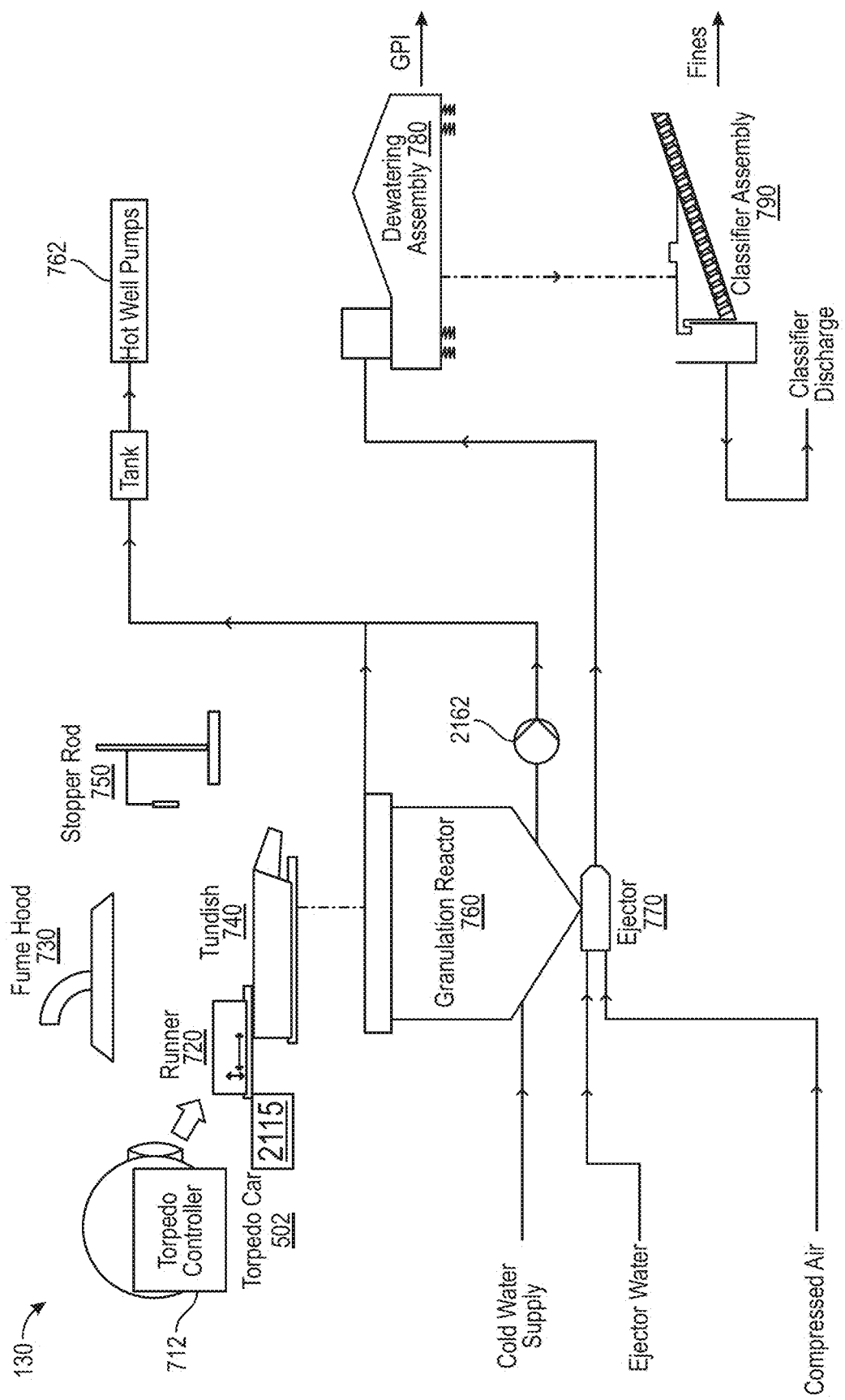
FIG. 21 is a schematic process flow diagram illustrating granulation of iron in accordance with embodiments of the present technology.

FIG. 21 is a schematic process flow diagram illustrating granulation of metal in accordance with embodiments of the present technology. A torpedo car 502 can transport molten metallics from the furnace unit 110 or the desulfurization unit 120 to the granulation unit 130 (see FIG. 1). The torpedo controller 712 can control the tilt angle of the torpedo car 502 to transfer (e.g., pour) the molten metallics from the torpedo car 502 to the runner 720 at a desired flow rate. In some embodiments, the molten metallics are transferred from the torpedo car 502 to a ladle (not shown) instead, and the molten metallics can be transferred from the ladle to the runner 720. The ladle can comprise a tilting ladle and/or include a slide gate or valve with associated controls. In some embodiments, the granulator unit 130 further includes a trough, bucket, tray, or other collector positioned below the torpedo car 502, the ladle, the runner 720, and/or the tundish 740 to receive any molten metallics or other material that may spill. The molten metallics can flow through the runner 720 and into the tundish 740. The fume hood 730 (among other fume hoods) can be positioned to collect emissions from the molten metallics flowing through the runner 720 and the tundish 740. The stopper rod assembly 750 can be coupled to the tundish 740 and operated to control the flow of molten metallics out of the tundish 740 and into the granulation reactor 760.

The granulation reactor 760 can receive cool water from a cold water supply. The molten metallics exiting the tundish 740 can impact a target of the granulation reactor 760 to be sprayed over the water pooled inside the granulation reactor 760. The granulation reactor 760 can granulate the molten metallics to form granulated products, such as by cooling the molten metal. The heated water can be sent to a tank, the hot well pumps 762, and eventually return to the cooling system 140. In some embodiments, a drain pump 2162 is included between the granulation reactor 760 and the tank for maintenance purposes. The ejector 770 can receive ejector water and/or compressed air to transfer the granulated products from the granulation reactor 760 to the dewatering assembly 780. The dewatering assembly 780 can dry and filter (e.g., by size) the granulated products to output GMU products. In some embodiments, the first and second granulator units 130 are configured to produce GMU at a rate that matches an output rate of the furnace unit 110. The filtrate from the dewatering assembly 780 can be sent to the classifier assembly 790, which can sort out and output GMU fines. The classifier discharge (e.g., remaining water and particulates therein) can be directed to the sump pump 764 or other processing. The various components of the granulator units 130 can be powered electrically, hydraulically, and/or via other methods.

Figure 22:
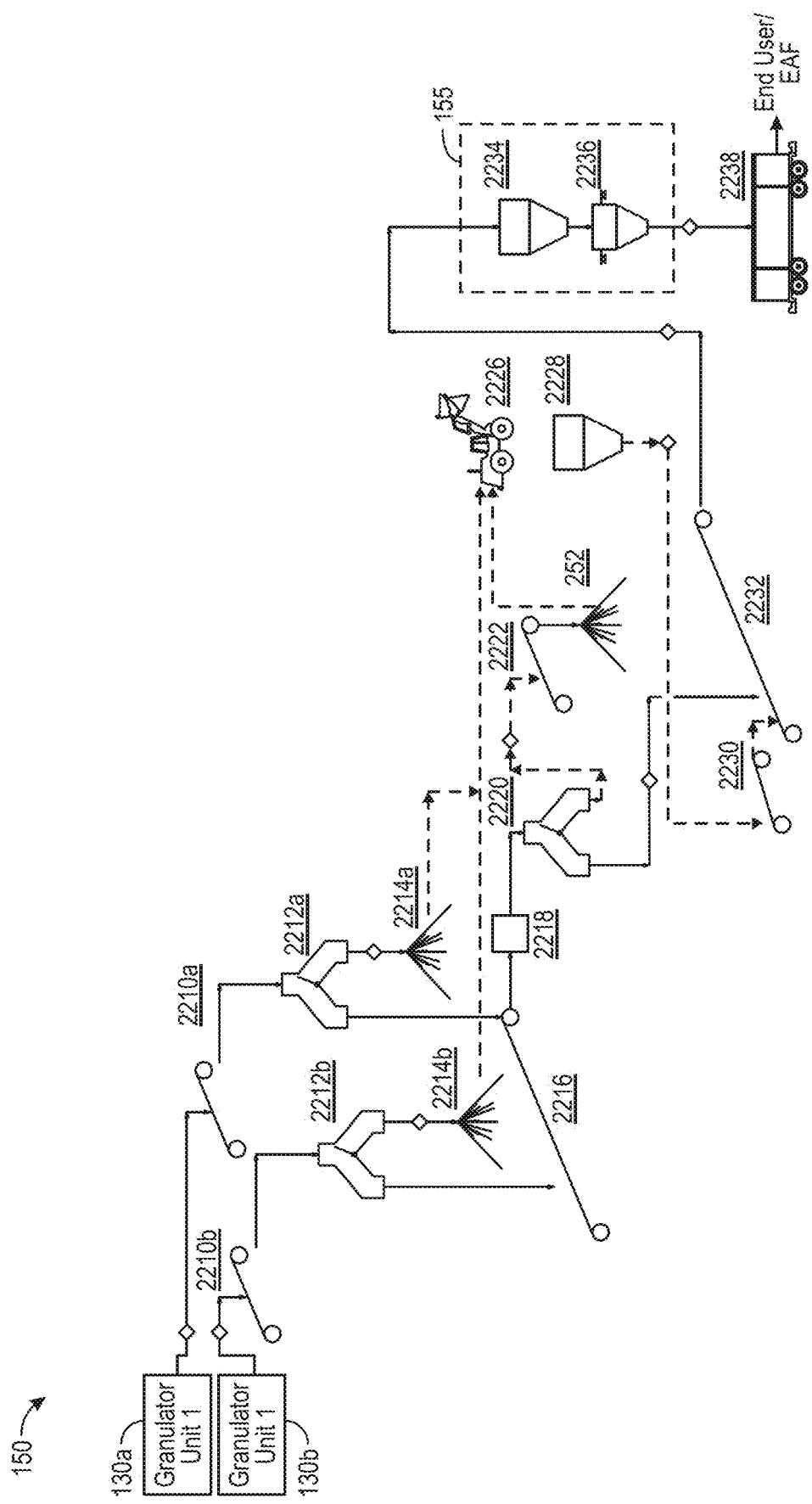
FIG. 22 is a schematic process flow diagram illustrating GMU product handling in accordance with embodiments of the present technology.

FIG. 22 is a schematic process flow diagram illustrating GMU product handling in accordance with embodiments of the present technology. In some embodiments, the flow diagram of FIG. 22 corresponds to operation of the product handling unit 150 illustrated in FIG. 1. Initially, the GMU products from the first and second granulator units 130*a*, 130*b* (e.g., from their respective dewatering assemblies 780) are handled separately. The GMU products from the first granulator unit 130*a* can be transported to a diverter 2212*a* via a conveyor 2210*a*, and the GMU products from the second granulator unit 130*b* can be transported to a diverter 2212*b* via a conveyor 2210*b*. Each of the diverters 2212*a*, 2212*b* can direct a portion of the received GMU products to a common stockpile conveyor 2216, and direct the remaining portion of the received GMU products to corresponding emergency bunkers 2214*a*, 2214*b*, respectively. The common stockpile conveyor 2216 can transport the GMU products to a GMU sampler 2218 that can take a sample for quality control purposes, and the GMU products can be subsequently sent to a diverter 2220.

The diverter 2220 can direct a portion of the received GMU products to a conveyor 2222 that leads to the GMU stockpile area 252, and direct the remaining portion of the received GMU products to a railcar loadout conveyor 2232. In some embodiments, to reclaim stockpiled GMU products, a transfer vehicle 2226 (e.g., a bulldozer) can transfer GMU products from the emergency bunkers 2214*a*, 2214*b* and/or the GMU stockpile area 252 to a manual reclaim hopper 2228. The manual reclaim hopper 2228 can direct the stockpiled GMU products to a manual reclaim feeder 2230, which directs the products to the railcar loadout conveyor 2232. The railcar loadout conveyor 2232 can transfer the GMU products to the GMU product loadout building 155, which can include a rail loadout surge hopper 2234 and a rail loadout weight hopper 2236. Details of the GMU product loadout building 155 are illustrated in and described below with reference to FIG. 23. The loadout building 155 can load the GMU products to a railcar 2238 or other transfer vessel, which can deliver the GMU products to an end user, an electric arc furnace (EAF), or other entity.

Figure 23:
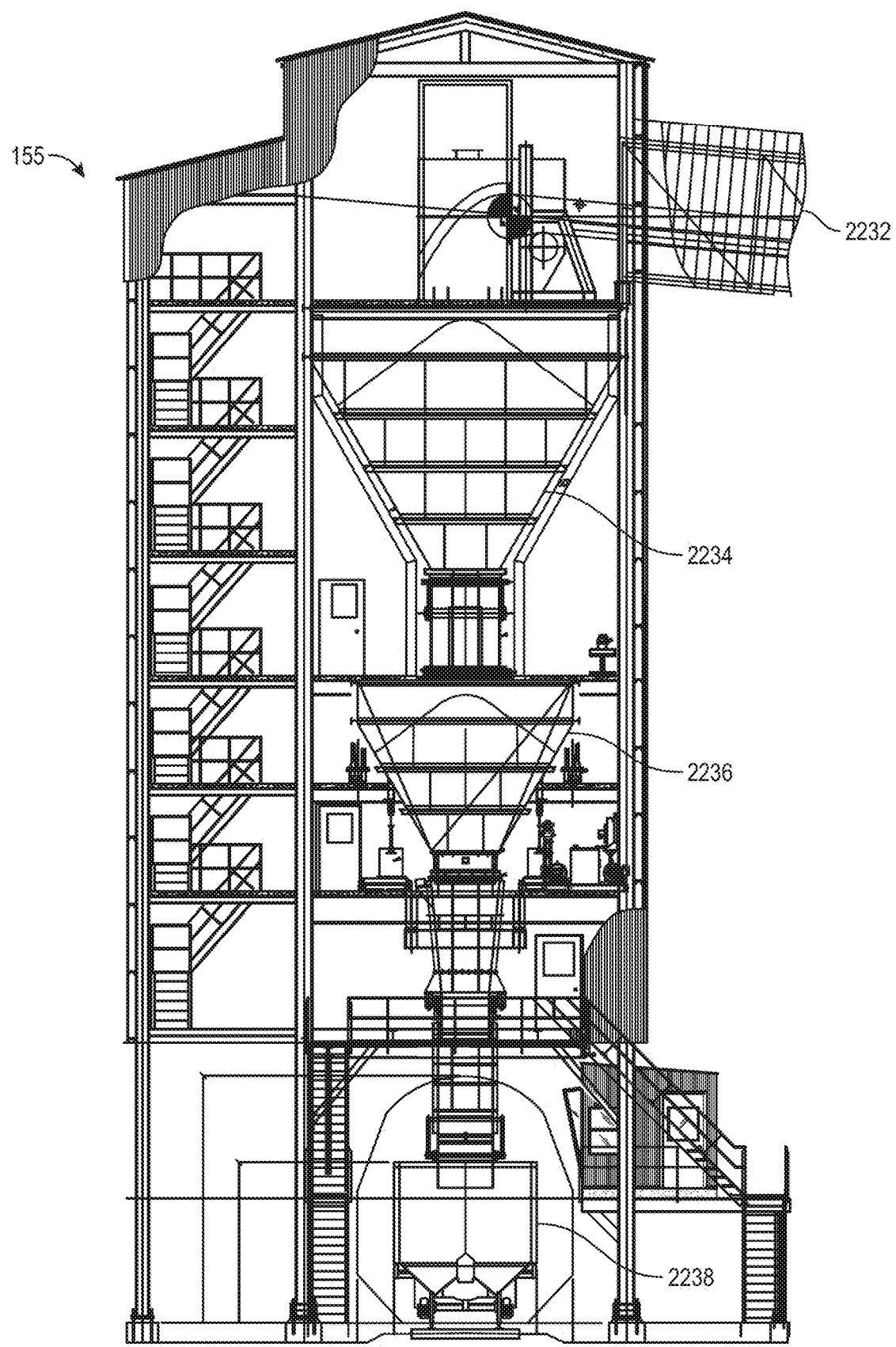
FIG. 23 is a front view of a GMU product loadout building configured in accordance with embodiments of the present technology.

FIG. 23 is a front view of the GMU product loadout building 155 configured in accordance with embodiments of the present technology. As discussed above, the GMU product loadout building 155 can include the rail loadout surge hopper 2234 and the rail loadout weight hopper 2236 positioned downstream of (e.g., below) the rail loadout surge hopper 2234. The railcar loadout conveyor 2232 can bring the GMU products to the top of the loadout building 155, allowing the GMU products to first enter the rail loadout surge hopper 2234. The surge hopper 2234 can serve as an intermediate or buffer storage to limit the amount of GMU products directed downstream to the weight hopper 2236. The weight hopper 2236 can receive the GMU products from the surge hopper 2234, and accurately measure and control the amount of GMU products loaded into the railcar 2238.

Figure 24:
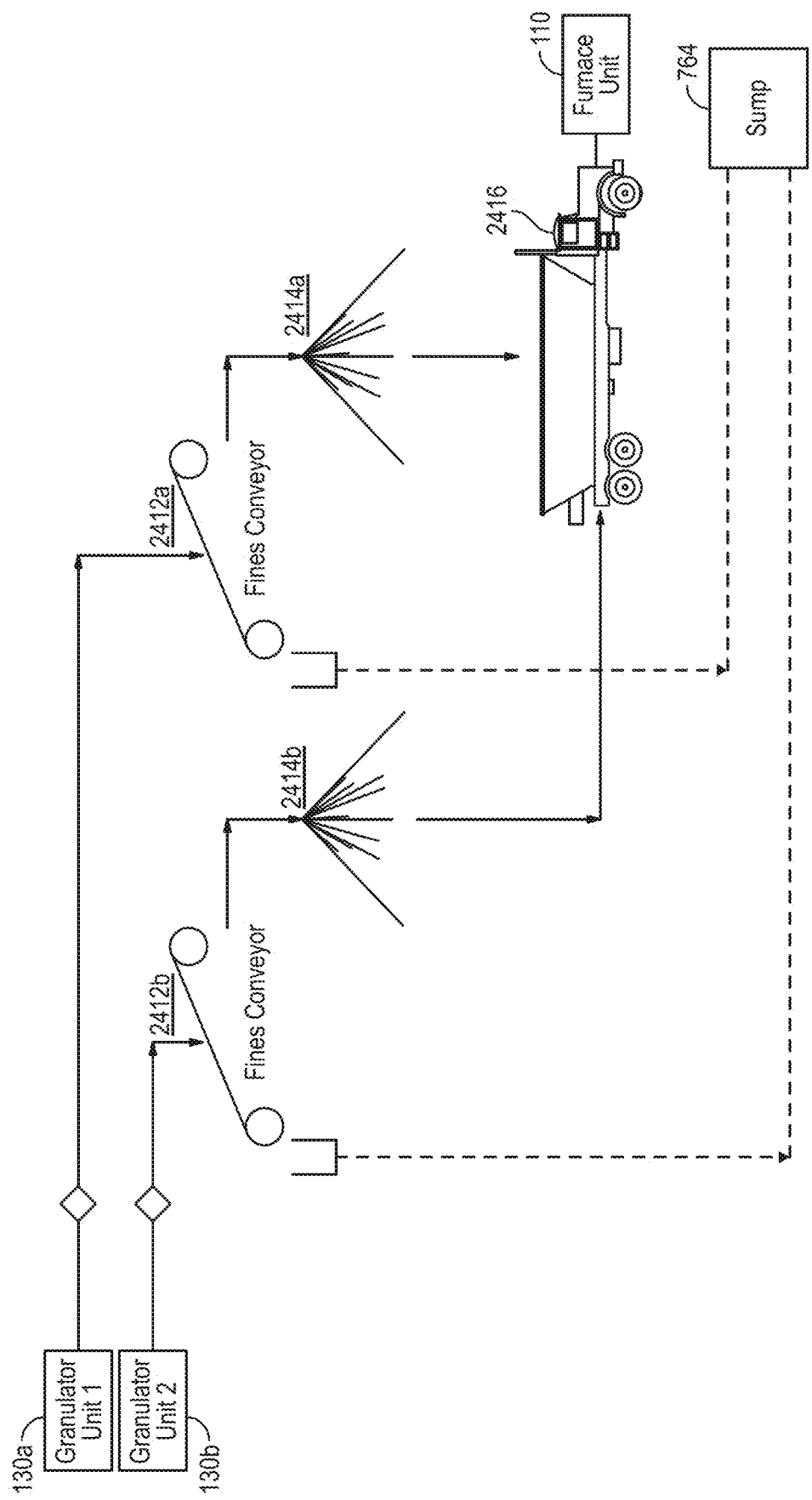
FIG. 24 is a schematic process flow diagram illustrating GMU fines handling in accordance with embodiments of the present technology.

FIG. 24 is a schematic process flow diagram illustrating GMU fines handling in accordance with embodiments of the present technology. In some embodiments, the flow diagram of FIG. 24 corresponds to operation of the fines handling unit 160 illustrated in FIG. 1. Initially, the GMU fines from the first and second granulator units 130*a*, 130*b* (e.g., from their respective classifier assemblies 790) are handled separately. The GMU fines from the first granulator unit 130*a* can be transported to a fines conveyor 2412*a*, and the GMU fines from the second granulator unit 130*b* can be transported to a fines conveyor 2412*b*. Excess water on the fines conveyors 2412*a*, 2412*b* can slide down and be directed to the sump pump 764, and the remaining fines can be directed to fines bunkers 2414*a*, 2414*b*. When the fines are ready to be transported, a fines transfer vessel 2416 (e.g., an articulated dump truck) can transport the fines from the fines bunkers 2414*a*, 2414*b* to the furnace unit 110 to be used as recycled material, or other processing (e.g., pelletization).

Figure 25:
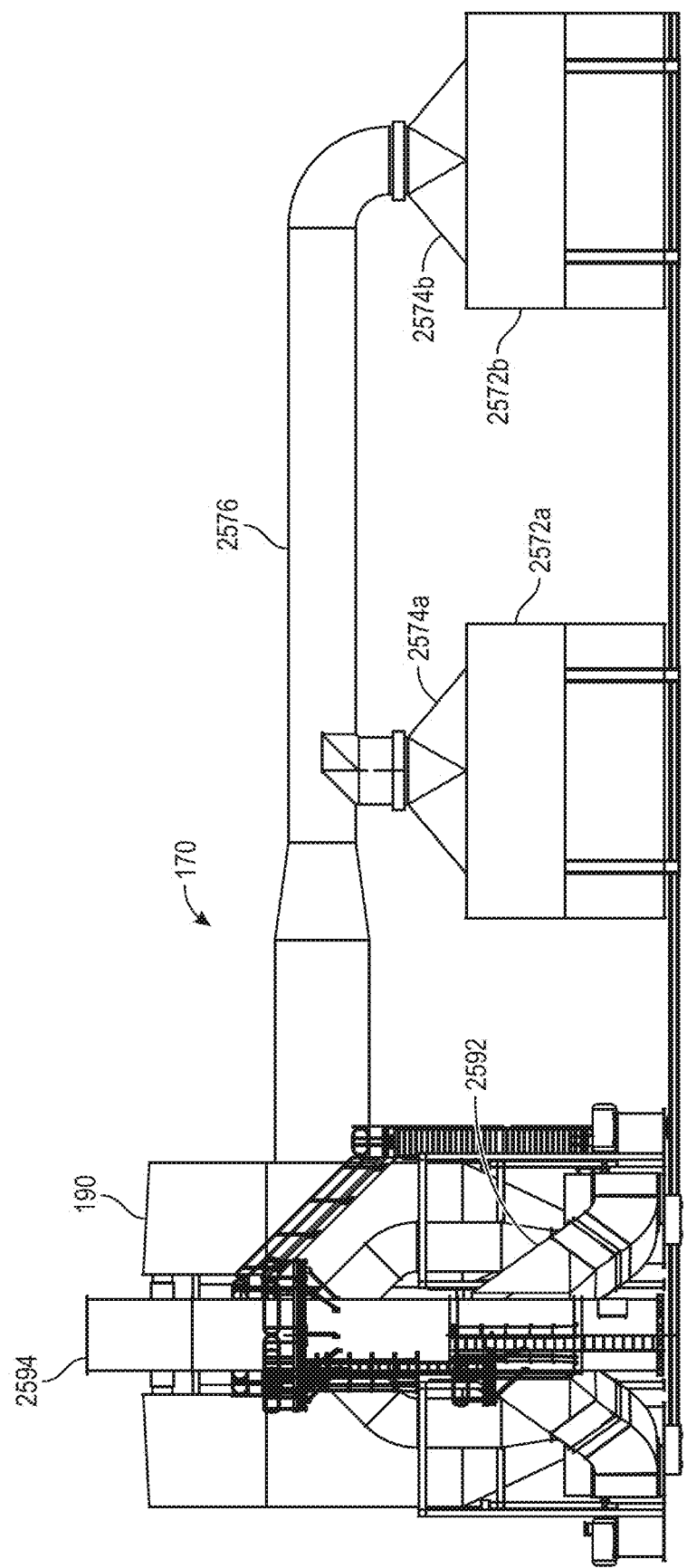
FIGS. 25 and 26 are side and front views, respectively, of a torpedo preparation unit configured in accordance with embodiments of the present technology.
Figure 26:
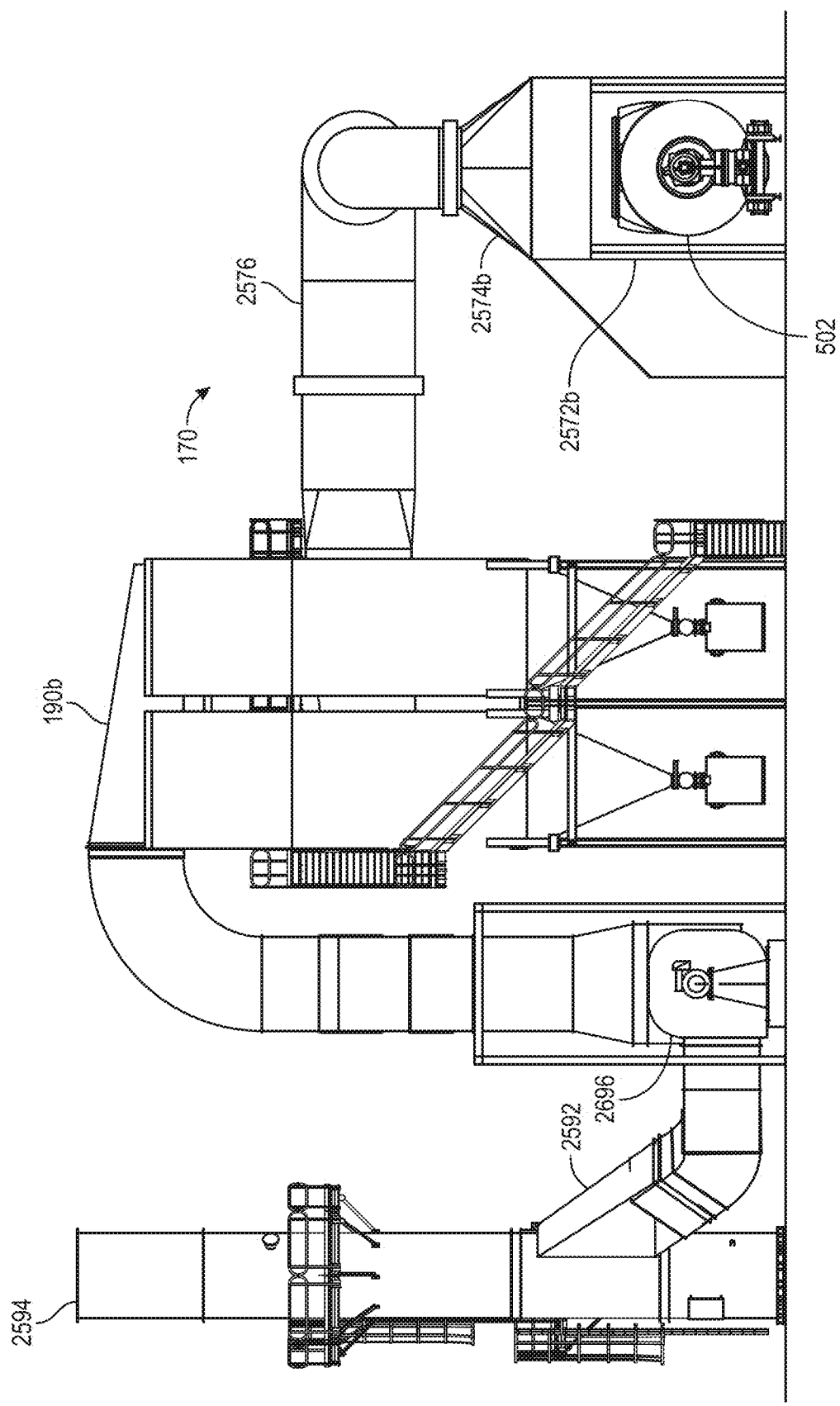

FIGS. 25 and 26 are side and front views, respectively, of the torpedo preparation unit 170, the second dust collection unit 190*b*, and an emissions stack 2594 configured in accordance with embodiments of the present technology. The torpedo preparation unit 170 can include first and second prep stations 2572*a*, 2572*b*, first and second emission hoods 2574*a*, 2574*b*, and an emissions pipe 2576. The first and second emission hoods 2574*a*, 2574*b* can be positioned over corresponding ones of the first and second prep stations 2572*a*, 2572*b*, and the emissions pipe 2576 can connect the first and second emission hoods 2574*a*, 2574*b* to the second dust collection unit 190*b*. The emissions stack 2594 can receive the waste gas from the second dust collection unit 190*b* via one or more fans 2696 and a connector pipe 2592.

In operation, the torpedo preparation unit 170 can provide deslagging, descaling (dekishing), and/or other preparation processes for efficient operation and longevity of the torpedo car 502 after the torpedo car 502 has transferred molten metallics to the granulator units 130*a*. Deslagging involves removing solidified slag that accumulates on the inner walls of the torpedo car 502, while descaling removes kish, a graphite-rich byproduct that forms during the cooling of molten metal. The processes can involve mechanical scraping, high-pressure water jets, or thermal lancing to effectively clean the surfaces of the torpedo cars 502. By including two prep stations 2572*a*, 2572*b*, the torpedo preparation unit 170 can prepare two torpedo cars 502 in parallel. It will be appreciated that the torpedo preparation unit 170 can include one, three, four, five, six, or more prep stations.

The first and second emission hoods 2574*a*, 2574*b* can capture and contain the dust, fumes, and/or other airborne pollutants generated during these processes. The first and second prep stations 2572*a*, 2572*b* can include sidewalls that define a partially enclosed space for further containing the airborne pollutants and for the first and second emission hoods 2574*a*, 2574*b* to better capture the airborne pollutants. The captured emissions can be directed to the second dust collection unit 190*b* via the pipe 2576. The second dust collection unit 190*b* can include a baghouse, scrubber, or other mechanism for separating particulates (e.g., dust) from the emissions. The separated particulates can be stored and eventually transferred to further processing. The remaining clean waste gas can be sent to the emissions stack 2594 via the fan 2696 and the connector pipe 2592 for being released into the atmosphere.

Figure 27:
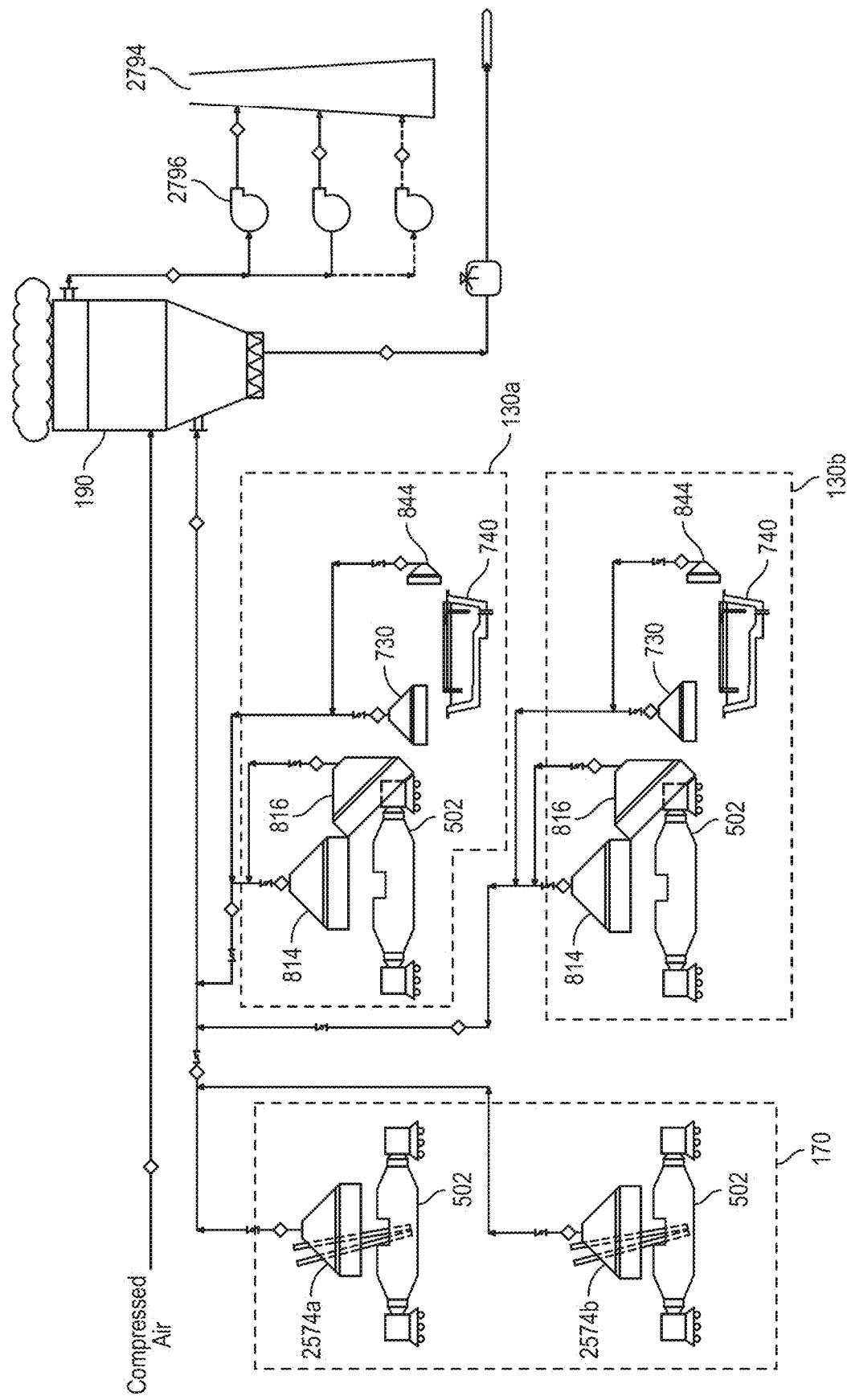
FIG. 27 is a schematic diagram illustrating flow of emissions in accordance with embodiments of the present technology.

FIG. 27 is a schematic diagram illustrating flow of emissions in accordance with embodiments of the present technology. As shown, emissions can be collected at various points in the system 100. For example, the emission hood 814 can collect emissions around the torpedo car 502 when the torpedo car 502 is tilting to transfer (e.g., pour) molten metallics into the runner 720 (not shown in FIG. 27) at each of the granulator units 130. As another example, the emission hoods 730 and 844 can collect emissions around the runner 720 and/or the tundish 740 at each of the granulator units 130. As yet another example, the first and second emission hoods 2574a, 2574b can collect emissions around the torpedo car 502 during deslagging and/or dekishing at the torpedo preparation unit 170.

The captured emissions can be directed to the dust collection unit 190. The dust collection unit 190 can include one or more baghouses, scrubbers, etc. The emissions captured at the various points in the system can be directed to a shared dust collection unit (as schematically shown in FIG. 27) or separate dust collection units (as schematically shown in FIG. 1). The dust collection unit 190 can separate dust and other particulates from the emissions for further processing, and send the clean waste gas (e.g., using pumps 2796) to one or more stacks 2794 to be released into the atmosphere.

In some embodiments, the system 100 can produce at least 1,000 tons, 2,000 tons, 3,000 tons, 4,000 tons, 5,000 tons, 6,000 tons, or 10,000 tons of GMU per day. In some embodiments, the system 100 can produce at least 1 million, 2 million, or 4 millions tons of GMU per year. In some embodiments, the first and second granulator units 130 are configured to form GMU at a rate that matches an output rate of the furnace unit 110.

IV. Methods for Producing GMU

Figure 28:
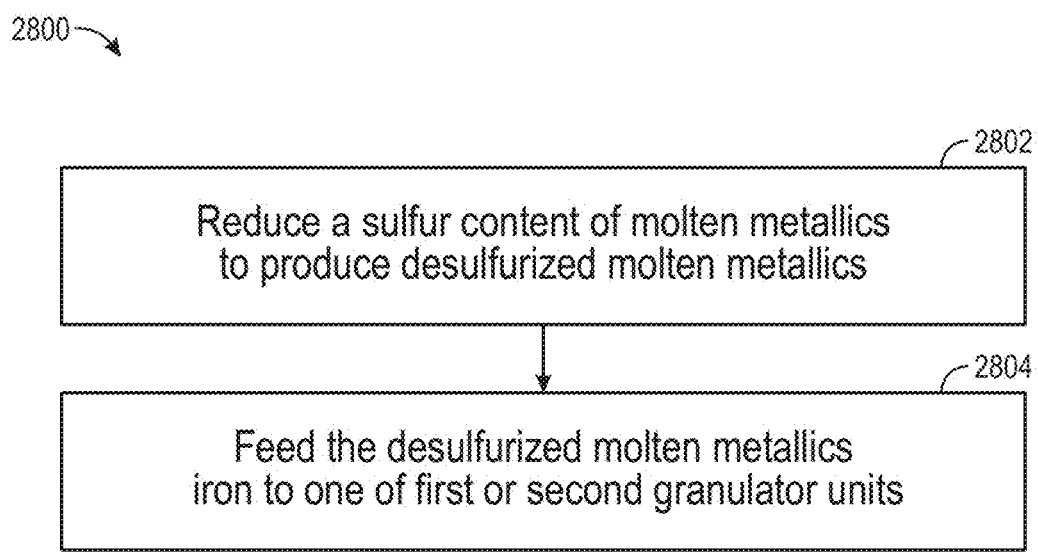
FIG. 28 is a flowchart illustrating a method for producing GMU in accordance with embodiments of the present technology.

FIG. 28 is a flowchart illustrating a method 2800 for producing GMU in accordance with embodiments of the present technology. While the steps of the method 2800 are described below in a particular order, one or more of the steps can be performed in a different order or omitted, and the method 2800 can include additional and/or alternative steps. Additionally, although the method 2800 may be described below with reference to the embodiments of the present technology described herein, the method 2800 can be performed with other embodiments of the present technology.

The method 2800 begins at block 2802 by reducing a sulfur content of the molten metallics to produce desulfurized molten metal. The sulfur content of the molten metallics can be reduced at a desulfurization unit (e.g., the desulfurization unit 120). In some embodiments, reducing the sulfur content includes adding at least one of calcium carbide or magnesium to the molten metal.

At block 2804, the method 2800 continues by feeding the desulfurized molten metallics to one of first or second granulator units (e.g., the granulator units 130). Feeding the desulfurized molten metallics can include (i) transferring the desulfurized molten metallics into a tundish (e.g., the tundish 740) of one of the first or second granulator units, (ii) directing the desulfurized molten metallics from the tundish into a reactor (e.g., the granulation reactor 760) of one of the first or second granulator units, and (iii) granulating the desulfurized molten metallics in the reactor to form GMU. In some embodiments, feeding the desulfurized molten metallics further comprises pouring the desulfurized molten metallics into a runner (e.g., the runner 720) positioned upstream of the tundish.

In some embodiments, granulating comprises ejecting the desulfurized molten metallics via a vibrating nozzle of the tundish. In some embodiments, granulating comprises extruding the desulfurized molten metallics (e.g., through an outlet of the tundish). In some embodiments, granulating comprises applying a pressurized stream of water to the desulfurized molten metallics to rapidly cool the molten metal.

In some embodiments, the method 2800 further includes moving or dithering (e.g., oscillating) a stopper rod (e.g., the stopper rod 1558 or 1658) to control a flow rate of the molten metallics out of an outlet (e.g., the outlet 842) of the tundish. In some embodiments, the method 2800 further includes ejecting (e.g., using the ejector 770) the GMU to a dewatering assembly (e.g., the dewatering assembly 780) of one of the first or second granulator units, and drying and filtering by size, at the dewatering assembly, the GMU. In some embodiments, the method 2800 further includes transferring filtrate from the dewatering assembly to a classifier assembly (e.g., the classifier assembly 790) of one of the first or second granulator units, and classifying, at the classifier assembly, the filtrate to output GMU fines. In some embodiments, the method 2800 further includes capturing, using one or more fume hoods (e.g., the fume hoods 528, 730, 814, 844), emissions from reducing the sulfur content of the molten metallics and operation of the first and second granulator units, and directing the captured emissions to a dust collection unit. In some embodiments, the method 2800 further includes transporting the desulfurized molten metallics to one of the first or second granulator units using a torpedo car (e.g., the torpedo car 502), and deslagging and dekishing the torpedo car (e.g., at the torpedo prep unit 170) after the torpedo car has transported the desulfurized molten metallics to one of the first or second granulator units. In some embodiments, the method 2800 further includes heating (e.g., using the heater 115) the molten metallics prior to feeding the desulfurized molten metallics to one of the first or second granulator units.

V. EXAMPLES

The present technology is illustrated, for example, according to various aspects described below as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A system for producing granulated metallic units (GMUs), the system comprising:
    first and second granulator units, wherein each of the first and second granulator units includes:
        a tundish positioned to receive molten metal, and
        a reactor positioned to receive the molten metallics from the tundish, wherein the reactor is configured to cool the molten metallics to form GMUs; and
    a feed system configured to transport the molten metallics to one of the first or second granulator units.

2. The system of any of the examples herein, wherein each of the first and second granulator units further includes a runner upstream of the tundish and configured to receive the molten metal, wherein the tundish is positioned to receive the molten metallics from the runner.

3. The system of any of the examples herein, wherein each of the first and second granulator units further includes a stopper rod assembly coupled to the tundish, wherein the stopper rod assembly include a stopper rod and an actuator operably coupled to move the stopper rod into and out of an outlet of the tundish.

4. The system of any of the examples herein, wherein each of the first and second granulator units further includes an ejector positioned to receive the GMU from the reactor and a lift line downstream of the ejector, wherein the lift line includes an inlet coupled to an outlet of the reactor and a jet inlet coupled to receive ejector water and compressed air to transfer the received GMU through the lift line.

5. The system of any of the examples herein, wherein each of the first and second granulator units further includes an ejector positioned to receive the GMU from the reactor and a lift line downstream of the reactor, wherein the lift line includes a curved region, and wherein the ejector further includes a rock box at the curved region, wherein the rock box is configured to receive and store a portion of the GMU received in the ejector.

6. The system of any of the examples herein, wherein each of the first and second granulator units further includes an ejector positioned to receive the GMU from the reactor and a lift line downstream of the reactor, wherein an inner surface of the lift line is lined with a liner material comprising silicon carbide, titanium, and/or tungsten carbide.

7. The system of any of the examples herein, wherein each of the first and second granulator units further includes a dewatering assembly positioned downstream of the reactor, wherein the dewatering assembly is configured to dry the GMU and filter the GMU by size.

8. The system of any of the examples herein, wherein each of the first and second granulator units further includes a dewatering assembly positioned downstream of the reactor, wherein the dewatering assembly is configured to filter out GMU fines less than 10 millimeter in size.

9. The system of any of the examples herein, wherein each of the first and second granulator units further includes a dewatering assembly positioned downstream of the reactor, wherein each of the first and second granulator units further includes an imaging device positioned to capture images of the GMU on the dewatering assembly, wherein the images captured by the imaging device are configured to be used in an optical granulometry feedback system to adjust a flow rate of the molten metallics into the reactor.

10. The system of any of the examples herein, wherein each of the first and second granulator units further includes a dewatering assembly positioned downstream of the reactor, wherein each of the first and second granulator units further includes a classifier assembly positioned downstream of the dewatering assembly, wherein the classifier assembly is configured to classify filtrate received from the dewatering assembly and output GMU fines.

11. The system of any of the examples herein, wherein each of the first and second granulator units further includes:
 a runner positioned upstream of the tundish;
 a dewatering assembly positioned downstream of the reactor;
 a classifier assembly positioned downstream of the dewatering assembly; and
 an overhead crane configured to selectively and individually lift the runner, the tundish, the reactor, the dewatering assembly, and/or the classifier assembly.

12. The system of any of the examples herein, wherein the feed system includes a torpedo car configured to transfer the molten metallics to the first or second granulator units, and wherein each of the first and second granulator units further includes:
 a first emission hood positioned above an anticipated position of the torpedo car when the torpedo car is transferring the molten metallics to the first or second granulator units;
 a second emission hood positioned at an angle and facing the anticipated position of the torpedo car when the torpedo car is transferring the molten metallics to the first or second granulator units;
 a third emission hood positioned at least partially over the tundish; and/or
 a fourth emission hood positioned at a front end of the tundish.

13. The system of any of the examples herein, wherein each of the first and second granulator units further includes a trough positioned beneath the runner and configured to collect molten metallics.

14. The system of any of the examples herein, further comprising a desulfurization unit upstream of the at least one of the first or second granulator units and configured to reduce a sulfur content of the molten metal, wherein the feed system is configured to transfer the molten metallics from the desulfurization unit to one of the first or second granulator units.

15. The system of any of the examples herein, further comprising a desulfurization unit upstream of the at least one of the first or second granulator units and configured to reduce a sulfur content of the molten metal, wherein the desulfurization unit is configured to reduce the sulfur content of the molten metallics by providing at least one of calcium carbide or magnesium to the molten metal.

16. The system of any of the examples herein, further comprising a product handling unit configured to (i) receive the GMUs from the first and second granulator units, (ii) direct a first portion of the received GMUs to a GMU stockpile, and (iii) direct a second portion of the received GMUs to a loadout.

17. The system of any of the examples herein, wherein the first and second granulator units are configured to output GMU fines separately from the GMUs, and wherein the system further comprises a fines handling unit configured to receive the GMU fines from the first and second granulator units and direct the received GMU fines to processing to be recycled.

18. The system of any of the examples herein, wherein the feed system includes a torpedo car configured to transfer the molten metallics to the first or second granulator units, and wherein the system further comprises a torpedo preparation unit configured to deslag and dekish the torpedo car.

19. The system of any of the examples herein, further comprising a cooling system configured to provide a coolant to the reactor.

20. The system of any of the examples herein, further comprising a dust collection unit coupled to receive captured emissions from the first and second granulator units.

21. The system of any of the examples herein, wherein the system is configured to produce at least 1,000 tons, 2,000 tons, 3,000 tons, 4,000 tons, 5,000 tons, 6,000 tons, or 10,000 tons of GMU per day.

22. The system of any of the examples herein, wherein the feed system is configured to transfer the molten metallics from a furnace unit, and wherein the first and second granulator units are configured to form GMUs at a rate that matches an output rate of the furnace unit.

23. The system of any of the examples herein, wherein the system is configured to primarily produce GMUs.

24. The system of any of the examples herein, wherein the system is configured to continuously produce GMUs for at least 2 hours, 4 hours, 6 hours, 12 hours, 16 hours, 20 hours, or 24 hours.

25. A method for producing granulated metallic units (GMUs), the method comprising:
reducing a sulfur content of molten metallics to produce desulfurized molten metal; and
feeding the desulfurized molten metallics to one of first or second granulator units, wherein feeding comprises:
transferring the desulfurized molten metallics into a tundish of one of the first or second granulator units,
directing the desulfurized molten metallics from the tundish into a reactor of one of the first or second granulator units, and
granulating the desulfurized molten metallics in the reactor to form GMUs.

26. The method of any of the examples herein, wherein granulating comprises ejecting the desulfurized molten metallics via a vibrating nozzle of the tundish.

27. The method of any of the examples herein, wherein granulating comprises extruding the desulfurized molten metal.

28. The method of any of the examples herein, wherein granulating comprises applying a pressurized stream of water to the desulfurized molten metal.

29. The method of any of the examples herein, wherein reducing the sulfur content comprises adding at least one of calcium carbide or magnesium to the molten metal.

30. The method of any of the examples herein, further comprising moving a stopper rod to control a flow rate of the molten metallics out of an outlet of the tundish.

31. The method of any of the examples herein, further comprising dithering a stopper rod to control a flow rate of the molten metallics out of an outlet of the tundish.

32. The method of any of the examples herein, wherein feeding the desulfurized molten metallics further comprises pouring the desulfurized molten metallics into a runner positioned upstream of the tundish.

33. The method of any of the examples herein, further comprising:
ejecting the GMUs to a dewatering assembly of one of the first or second granulator units; and
drying and filtering by size the GMUs at the dewatering assembly.

34. The method of any of the examples herein, further comprising:
transferring filtrate from a dewatering assembly to a classifier assembly of one of the first or second granulator units; and
classifying, at the classifier assembly, the filtrate to output GMU fines having an average size of less than 1 mm.

35. The method of any of the examples herein, further comprising:
capturing, using one or more fume hoods, emissions from reducing the sulfur content of the molten metallics and operation of the first and second granulator units; and
directing the captured emissions to a dust collection unit.

36. The method of any of the examples herein, further comprising:
transporting the desulfurized molten metallics to one of the first or second granulator units using a torpedo car; and
deslagging and/or dekishing the torpedo car after the torpedo car has transported the desulfurized molten metallics to one of the first or second granulator units.

37. The method of any of the examples herein, further comprising heating the molten metallics prior to feeding the desulfurized molten metallics to one of the first or second granulator units.

38. A desulfurization unit, comprising:
a hopper configured to hold one or more sulfur-reducing agents;
a lance coupled to receive the one or more sulfur-reducing agents from the hopper; and
a crane positioned to move the lance at least partially into first and second torpedo cars movable within and external to the desulfurization unit.

39. The desulfurization unit of any of the examples herein, wherein the one or more sulfur-reducing agents comprise at least one of calcium carbide or magnesium.

40. The desulfurization unit of any of the examples herein, further comprising first and second emission hoods configured to be positioned over the first and second torpedo cars, respectively.

41. The desulfurization unit of any of the examples herein, further comprising a tanker trailer storing at least one of the one or more sulfur-reducing agents.

42. A runner configured to receive molten metal, the runner comprising:
a runner body including:
a cavity defining an opening configured to receive molten metal, and
an outlet channel at a distal end of the runner body; and
an overflow channel fluidically coupled to the cavity and removably coupled to a side portion of the runner body, wherein the overflow channel is positioned to receive and direct overflow of the molten metallics and/or slag from the cavity.

43. The runner of any of the examples herein, further comprising a flow control device coupled to the runner body between the opening and the outlet channel, wherein the flow control device is configured to (i) reduce a turbulence level of the molten metallics exiting the cavity via the outlet channel and (ii) block at least a portion of slag floating on the molten metallics from exiting the cavity via the outlet channel.

44. The runner of any of the examples herein, further comprising a flow control device coupled to the runner body between the opening and the outlet channel, wherein the flow control device comprises a solid plate extending vertically through at least a portion of the cavity.

45. The runner of any of the examples herein, further comprising a flow control device coupled to the runner body between the opening and the outlet channel, wherein the flow control device is configured to block air, gas, foam, and/or bubbles in the molten metallics from traveling to the outlet channel.

46. The runner of any of the examples herein, further comprising a flow control device coupled to the runner body between the opening and the outlet channel, wherein the flow control device comprises a plate having an array of holes.

47. The runner of any of the examples herein, further comprising one or more splash shields coupled to a top portion of the runner body and disposed around two or more sides of the opening.

48. The runner of any of the examples herein, further comprising one or more splash shields coupled to a top portion of the runner body and disposed around a front end, a rear end, and sides of the opening of the cavity.

49. The runner of any of the examples herein, further comprising a liner material along an inner surface of the runner body, wherein the liner material includes at least one of silica or alumina.

50. The runner of any of the examples herein, further comprising a liner material disposed along an inner surface of the runner body, wherein the liner material does not include magnesia.

51. The runner of any of the examples herein, wherein the overflow channel is removably coupled to the side portion of the runner body via bolts.

52. The runner of any of the examples herein, further comprising a level sensor coupled to an inner surface of the runner body and configured to measure a surface level of the molten metallics in the cavity.

53. The runner of any of the examples herein, further comprising a load sensor coupled to an inner surface of the runner body and configured to measure a mass of the molten metallics in the cavity.

54. The runner of any of the examples herein, further comprising a plurality of trunnions coupled to and extending outward from the runner body, wherein the trunnions are shaped and sized to receive hooks of an overhead crane.

55. A system for controlling flow of molten metal, the system comprising:
 a tundish comprising:
  a tundish body including:
   a cavity having an opening, wherein the opening is configured to receive molten metal, and
   an outlet channel at a lower portion of the tundish body; and
  an overflow channel removably coupled to a distal end portion of the tundish body, wherein the overflow channel is positioned to receive and direct overflow of the molten metallics and/or slag out of the cavity.

56. The system of any of the examples herein, wherein the tundish further comprises a nozzle positioned in the outlet channel of the tundish body, wherein the nozzle comprises at least one of silica carbide, graphite, or a non-wetting material.

57. The system of any of the examples herein, wherein the tundish further comprises a nozzle positioned at a lowermost point of the tundish body.

58. The system of any of the examples herein, wherein the tundish further comprises a flow control device coupled to the tundish body between the opening and the outlet channel, wherein the flow control device is configured to (i) reduce a turbulence level of the molten metallics exiting the cavity via the outlet channel and (ii) block at least a portion of slag floating on the molten metallics from exiting the cavity via the outlet channel.

59. The system of any of the examples herein, further comprising a cover positioned at least partially over the opening of the cavity.

60. The system of any of the examples herein, wherein the tundish further comprises a liner material along an inner surface of the tundish body, wherein the liner material includes at least one of silica or alumina.

61. The system of any of the examples herein, wherein the tundish further comprises a liner material along an inner surface of the tundish body, wherein the liner material does not include magnesia.

62. The system of any of the examples herein, wherein the tundish further comprises a plurality of trunnions coupled to and extending outward from the tundish body, wherein the trunnions are shaped and sized to receive hooks of an overhead crane.

63. The system of any of the examples herein, further comprising a stopper rod assembly coupled to the tundish body, wherein the stopper rod assembly includes:
 a stopper rod positioned over the outlet channel of the tundish body; and
 an actuator coupled to the tundish body and configured to move the stopper rod into and out of the outlet channel of the tundish body.

V. CONCLUSION

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." "About" as used herein can represent a range of plus or minus 10% of the stated value. Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A method for producing granulated metallic units (GMUs), the method comprising:
   reducing a sulfur content of molten metallics to produce desulfurized molten metallics;
   feeding the desulfurized molten metallics to one of first or second granulator units, wherein feeding comprises:
      transferring the desulfurized molten metallics into a tundish of one of the first or second granulator units,
      directing the desulfurized molten metallics from the tundish into a reactor of one of the first or second granulator units, and
      granulating the desulfurized molten metallics in the reactor to form GMUs;
   filtering the GMUs in a dewatering assembly to form a filtrate and transferring filtrate from the dewatering assembly to a classifier assembly of one of the first or second granulator units, and
   classifying, at the classifier assembly, the filtrate to output GMU fines having an average size of less than 1 mm.

2. The method of claim 1, wherein granulating comprises ejecting the desulfurized molten metallics via a vibrating nozzle of the tundish.

3. The method of claim 1, wherein granulating comprises extruding the desulfurized molten metallics.

4. The method of claim 1, wherein granulating comprises applying a pressurized stream of water to the desulfurized molten metallics.

5. The method of claim 1, wherein reducing the sulfur content comprises adding at least one of calcium carbide or magnesium to the molten metallics.

6. The method of claim 1, further comprising dithering a stopper rod to control a flow rate of the molten metallics out of an outlet of the tundish.

7. The method of claim 1, further comprising:
   ejecting the GMUs to a dewatering assembly of one of the first or second granulator units; and
   drying and filtering by size the GMUs at the dewatering assembly.

8. The method of claim 1, further comprising:
   transporting the desulfurized molten metallics to one of the first or second granulator units using a torpedo car; and
   deslagging and/or dekishing the torpedo car after the torpedo car has transported the desulfurized molten metallics to one of the first or second granulator units.

9. The method of claim 1, wherein granulating comprises forming, via the first and/or second granulator units, the GMUs for at least 6 hours continuously.

10. The method of claim 1, wherein granulating comprises forming, via the first and/or second granulator units, the GMUs for at least 12 hours continuously.

11. A method for producing granulated metallic units (GMUs), the method comprising:
   feeding molten metallics to one of first or second granulator units, wherein feeding comprises:
      transferring the molten metallics into a tundish of one of the first or second granulator units,
      directing the molten metallics from the tundish into a reactor of one of the first or second granulator units, and
      granulating the molten metallics in the reactor to form GMUs;
   filtering the GMUs in a dewatering assembly to form a filtrate and transferring filtrate from the dewatering assembly to a classifier assembly of one of the first or second granulator units; and
   classifying, at the classifier assembly, the filtrate to output GMU fines.

* * * * *